(12) United States Patent
Ramberg et al.

(10) Patent No.: US 9,833,932 B1
(45) Date of Patent: Dec. 5, 2017

(54) LAYERED STRUCTURES

(76) Inventors: Charles E. Ramberg, Los Altos, CA (US); Stephen A. Dynan, Boalsburg, PA (US)

( * ) Notice: Subject to any disclaimer, the term of this patent is extended or adjusted under 35 U.S.C. 154(b) by 1445 days.

(21) Appl. No.: 13/171,489

(22) Filed: Jun. 29, 2011

Related U.S. Application Data

(60) Provisional application No. 61/359,825, filed on Jun. 30, 2010.

(51) Int. Cl.
| | |
|---|---|
| *B29C 41/28* | (2006.01) |
| *B29C 41/12* | (2006.01) |
| *B29C 41/24* | (2006.01) |
| *B29C 41/16* | (2006.01) |
| *B29C 41/26* | (2006.01) |
| *B29C 41/22* | (2006.01) |

(52) U.S. Cl.
CPC ............ *B29C 41/12* (2013.01); *B29C 41/24* (2013.01); *B29C 41/16* (2013.01); *B29C 41/22* (2013.01); *B29C 41/26* (2013.01); *B29C 41/28* (2013.01)

(58) Field of Classification Search
CPC ......... B29C 41/12; B29C 41/16; B29C 41/22; B29C 41/26; B29C 41/28
USPC .... 425/224, 447, 448, 133.5, 134, 141, 145, 425/147, 425, 432
See application file for complete search history.

(56) References Cited

U.S. PATENT DOCUMENTS

| | | |
|---|---|---|
| 293,745 A | 2/1884 | Hyatt |
| 1,852,489 A | 4/1932 | Sullivan |
| 1,924,010 A * | 8/1933 | Wickham ................ 425/447 |
| 2,052,695 A * | 9/1936 | Chiverton ................ 264/76 |
| 2,449,822 A | 9/1948 | Schibbye |
| 2,544,752 A | 3/1951 | Gelbman |
| 2,659,103 A * | 11/1953 | Merritt ................... 222/556 |
| 2,714,745 A * | 8/1955 | Kenyon ................... 425/75 |
| 2,892,240 A | 6/1959 | Frankenhoff |
| 2,926,137 A | 2/1960 | Calvert |
| 2,946,112 A | 7/1960 | Tucker, Jr. |
| 3,252,181 A * | 5/1966 | Hureau ................... 425/224 |
| 3,274,319 A * | 9/1966 | Clegg ..................... 264/126 |

(Continued)

FOREIGN PATENT DOCUMENTS

| | | |
|---|---|---|
| EP | 0337047 | 10/1998 |
| EP | 1600202 A1 | 11/2005 |

(Continued)

OTHER PUBLICATIONS

Resubmission with additional pages(since previously submitted IDS) of machine translation of JP 2005-060159 A (Yamazaki), published Mar. 10, 2005, as provided by USPTO in (U.S. Appl. No. 13/327,300) May 3, 2012.

(Continued)

*Primary Examiner* — Seyed Masoud Malekzadeh
(74) *Attorney, Agent, or Firm* — Bresbo AB

(57) ABSTRACT

Systems and methods provide for forming layered structures. Textured tapes may be fabricated, having cast and/or embossed patterns that provide for desired flow characteristics in an assembly of stacked, rolled, and/or otherwise assembled tapes. In some cases, shear thinning materials may be formed into textured tapes using localized shear stress to induce shear thinning during a pattern formation. A pattern may be maintained after removal of the shear force due to the high viscosity of the material at low shear stress.

20 Claims, 13 Drawing Sheets

(56) References Cited

U.S. PATENT DOCUMENTS

| | | | |
|---|---|---|---|
| 3,343,680 A | 9/1967 | Rice et al. | |
| 3,505,008 A | 4/1970 | Frevel et al. | |
| 3,574,530 A | 4/1971 | Suriani et al. | |
| 3,704,786 A | 12/1972 | Lerner | |
| 3,739,553 A | 6/1973 | Aine | |
| 3,824,196 A | 7/1974 | Benbow et al. | |
| 3,885,977 A | 5/1975 | Lachman | |
| 3,938,927 A * | 2/1976 | Brinkmann et al. | 425/373 |
| 3,940,301 A | 2/1976 | Straw | |
| 3,942,990 A | 3/1976 | Engstrom et al. | |
| 3,953,562 A | 4/1976 | Hait | |
| 3,953,703 A | 4/1976 | Hurwitt et al. | |
| 3,954,672 A | 5/1976 | Somers et al. | |
| 3,957,694 A | 5/1976 | Bolon | |
| 3,975,201 A | 8/1976 | Greenstein | |
| 3,991,149 A | 11/1976 | Hurwitt | |
| 4,006,533 A | 2/1977 | Squires | |
| 4,011,036 A * | 3/1977 | Bichet | 425/217 |
| 4,025,462 A | 5/1977 | Cleveland | |
| 4,041,591 A | 8/1977 | Noll et al. | |
| 4,041,592 A | 8/1977 | Kelm | |
| 4,069,063 A | 1/1978 | Ball | |
| 4,071,369 A | 1/1978 | Kurz et al. | |
| 4,073,729 A | 2/1978 | Kraemer et al. | |
| 4,080,414 A | 3/1978 | Anderson et al. | |
| 4,107,013 A | 8/1978 | McGinniss et al. | |
| 4,110,187 A | 8/1978 | Sloan | |
| 4,120,735 A | 10/1978 | Smith | |
| 4,124,365 A | 11/1978 | Williams | |
| 4,142,864 A | 3/1979 | Rosynsky et al. | |
| 4,166,037 A | 8/1979 | Montagnon | |
| 4,190,533 A | 2/1980 | Hirs | |
| 4,191,546 A | 3/1980 | Kroyer | |
| 4,197,205 A | 4/1980 | Hirs | |
| 4,225,443 A | 9/1980 | Harris et al. | |
| 4,253,992 A | 3/1981 | Soejima et al. | |
| 4,254,616 A | 3/1981 | Siminski et al. | |
| 4,255,166 A | 3/1981 | Gernand et al. | |
| 4,264,346 A | 4/1981 | Mann | |
| 4,276,062 A | 6/1981 | Lyon | |
| 4,276,071 A | 6/1981 | Outland | |
| 4,293,514 A | 10/1981 | Wada | |
| 4,329,162 A | 5/1982 | Pitcher, Jr. | |
| 4,353,854 A | 10/1982 | Oyamada et al. | |
| 4,379,039 A | 4/1983 | Fujimoto | |
| 4,392,897 A * | 7/1983 | Herrington | 156/66 |
| 4,415,344 A | 11/1983 | Frost et al. | |
| 4,416,675 A | 11/1983 | Montierth | |
| 4,430,108 A | 2/1984 | Hojaji et al. | |
| 4,436,682 A | 3/1984 | Knopp | |
| 4,440,867 A | 4/1984 | Sabherwal | |
| 4,452,635 A | 6/1984 | Noshi et al. | |
| 4,453,906 A * | 6/1984 | Hayashi | 425/224 |
| 4,483,944 A | 11/1984 | Day et al. | |
| 4,587,068 A | 5/1986 | Borase et al. | |
| 4,601,332 A | 7/1986 | Oda | |
| 4,613,374 A | 9/1986 | Smith | |
| 4,626,359 A | 12/1986 | Bennett et al. | |
| 4,629,483 A | 12/1986 | Stanton | |
| 4,637,995 A | 1/1987 | DeAngelis | |
| 4,645,605 A | 2/1987 | Durham | |
| 4,652,411 A | 3/1987 | Swarr et al. | |
| 4,681,788 A | 7/1987 | Barito | |
| 4,743,382 A | 5/1988 | Williamson | |
| 4,747,945 A | 5/1988 | Kreusch | |
| 4,765,545 A | 8/1988 | Van Kruining | |
| 4,777,153 A | 10/1988 | Sonuparlak | |
| 4,786,342 A | 11/1988 | Zellner et al. | |
| 4,804,521 A | 2/1989 | Rochelle | |
| 4,817,367 A * | 4/1989 | Ishikawa et al. | 53/454 |
| 4,863,538 A | 9/1989 | Deckard | |
| 4,871,495 A | 10/1989 | Helferich | |
| 4,877,506 A | 10/1989 | Fee et al. | |
| 4,883,497 A | 11/1989 | Claar et al. | |
| 4,888,054 A | 12/1989 | Pond | |
| 4,898,105 A | 2/1990 | Rappoldt | |
| 4,898,631 A | 2/1990 | Collins, Jr. | |
| 4,944,817 A | 7/1990 | Bourell et al. | |
| 4,964,888 A | 10/1990 | Miller | |
| 4,968,460 A | 11/1990 | Thompson et al. | |
| 4,971,601 A | 11/1990 | Najjar | |
| 4,973,459 A | 11/1990 | Lippert | |
| 4,976,760 A | 12/1990 | Helferich | |
| 5,002,710 A | 3/1991 | Shanefield | |
| 5,071,449 A | 12/1991 | Sircar | |
| 5,078,795 A | 1/1992 | Conner et al. | |
| 5,086,093 A | 2/1992 | Miller | |
| 5,096,464 A | 3/1992 | Yamamoto | |
| 5,100,633 A | 3/1992 | Morrison | |
| 5,108,614 A | 4/1992 | Ross et al. | |
| 5,145,826 A | 9/1992 | Hirschberg et al. | |
| 5,203,936 A | 4/1993 | Dolhert | |
| 5,204,055 A | 4/1993 | Sachs et al. | |
| 5,215,724 A | 6/1993 | Haerle | |
| 5,221,484 A | 6/1993 | Goldsmith | |
| 5,229,078 A | 7/1993 | Haerle | |
| 5,232,955 A | 8/1993 | Csabai et al. | |
| 5,238,057 A | 8/1993 | Schelter | |
| 5,240,485 A | 8/1993 | Haerle | |
| 5,244,726 A | 9/1993 | Laney et al. | |
| 5,256,609 A | 10/1993 | Dolhert | |
| 5,266,279 A | 11/1993 | Haerle | |
| 5,275,771 A | 1/1994 | Bush | |
| 5,279,994 A | 1/1994 | Kerkar | |
| 5,284,695 A | 2/1994 | Barlow | |
| 5,292,436 A | 3/1994 | Mathews | |
| 5,306,646 A | 4/1994 | Lauf | |
| 5,308,457 A | 5/1994 | Dalla Betta et al. | |
| 5,322,562 A | 6/1994 | Ellenberger et al. | |
| 5,335,492 A | 8/1994 | Zirkel | |
| 5,345,761 A | 9/1994 | King et al. | |
| 5,364,573 A | 11/1994 | Noky | |
| 5,401,481 A | 3/1995 | Rochelle et al. | |
| 5,401,695 A | 3/1995 | Wu | |
| 5,405,571 A | 4/1995 | Truckner | |
| 5,409,870 A | 4/1995 | Locker | |
| 5,425,236 A | 6/1995 | Haerle | |
| 5,427,721 A | 6/1995 | Brezny | |
| 5,429,779 A | 7/1995 | Locker | |
| 5,433,904 A | 7/1995 | Noky | |
| 5,456,965 A | 10/1995 | Machida | |
| 5,473,008 A | 12/1995 | Hessel et al. | |
| 5,476,375 A | 12/1995 | Khinkis | |
| 5,497,620 A | 3/1996 | Stobbe | |
| 5,498,288 A | 3/1996 | Noky | |
| 5,519,087 A | 5/1996 | Tang | |
| 5,525,665 A | 6/1996 | Moeggenborg et al. | |
| 5,547,640 A | 8/1996 | Kim | |
| 5,551,971 A | 9/1996 | Chadderton et al. | |
| 5,626,763 A | 5/1997 | Mathews | |
| 5,639,402 A | 6/1997 | Barlow et al. | |
| 5,645,730 A | 7/1997 | Malachosky et al. | |
| 5,658,372 A | 8/1997 | Gadkaree | |
| 5,686,039 A | 11/1997 | Merry | |
| 5,705,444 A | 1/1998 | Tompkins et al. | |
| 5,707,574 A | 1/1998 | Domesle et al. | |
| 5,711,833 A | 1/1998 | Apte et al. | |
| 5,714,228 A | 2/1998 | Beckmeyer | |
| 5,728,198 A | 3/1998 | Acharya et al. | |
| 5,731,562 A | 3/1998 | Beckmeyer | |
| 5,733,352 A | 3/1998 | Ogawa | |
| 5,750,026 A | 5/1998 | Gadkaree et al. | |
| 5,762,968 A * | 6/1998 | Swaidner et al. | 425/96 |
| 5,766,528 A | 6/1998 | Su | |
| 5,901,683 A | 5/1999 | Patel | |
| 5,904,892 A | 5/1999 | Holmes et al. | |
| 5,965,257 A | 10/1999 | Ahluwalia | |
| 5,983,488 A | 11/1999 | Erickson | |
| 5,997,794 A | 12/1999 | Huang et al. | |
| 6,183,845 B1 * | 2/2001 | Ikemoto | 428/213 |
| 6,196,344 B1 | 3/2001 | Tamor et al. | |
| 6,200,379 B1 | 3/2001 | Strabala | |
| 6,213,754 B1 * | 4/2001 | Doty et al. | 425/219 |
| 6,238,618 B1 | 5/2001 | Brundage et al. | |

(56) References Cited

U.S. PATENT DOCUMENTS

| | | |
|---|---|---|
| 6,258,334 B1 | 7/2001 | Gadkaree et al. |
| 6,290,847 B1 | 9/2001 | Cutler |
| 6,296,794 B1 | 10/2001 | Day et al. |
| 6,322,605 B1 | 11/2001 | He et al. |
| 6,328,779 B1 | 12/2001 | He et al. |
| 6,368,102 B1 | 4/2002 | Ibrahim et al. |
| 6,375,451 B1 | 4/2002 | Robinson et al. |
| 6,405,875 B1 | 6/2002 | Cutler |
| 6,409,817 B1 | 6/2002 | Stephens |
| 6,421,599 B1 | 7/2002 | Lippa et al. |
| 6,440,198 B1 | 8/2002 | Yang |
| 6,454,941 B1 | 9/2002 | Cutler et al. |
| 6,461,632 B1 | 10/2002 | Gogolewski |
| 6,464,744 B2 | 10/2002 | Cutler |
| 6,468,325 B1 | 10/2002 | Cutler |
| 6,492,119 B1 | 12/2002 | Ogawa |
| 6,612,835 B2 | 9/2003 | Ibrahim |
| 6,613,299 B2 | 9/2003 | Dang et al. |
| 6,673,300 B2 | 1/2004 | Allen et al. |
| 6,695,967 B2 | 2/2004 | Bishop et al. |
| 6,696,132 B2 | 2/2004 | Beall |
| 6,729,867 B2* | 5/2004 | Peter et al. ............ 425/132 |
| 6,743,513 B2 | 6/2004 | Mecholsky et al. |
| 6,755,016 B2 | 6/2004 | Dittler et al. |
| 6,767,500 B2* | 7/2004 | Yamazaki et al. ............ 264/556 |
| 6,770,111 B2 | 8/2004 | Morena et al. |
| 6,827,754 B2 | 12/2004 | Suwabe et al. |
| 6,835,224 B2 | 12/2004 | Cheng |
| 6,843,822 B2 | 1/2005 | Beall |
| 6,848,897 B2* | 2/2005 | Lazarev et al. ............ 425/224 |
| 6,849,181 B2 | 2/2005 | Ogunwumi |
| 6,881,703 B2 | 4/2005 | Cutler et al. |
| 6,883,321 B2 | 4/2005 | Fornof |
| 6,887,291 B2 | 5/2005 | Alford et al. |
| 6,890,616 B2 | 5/2005 | Suwabe et al. |
| 6,923,941 B2 | 8/2005 | Huthwohl et al. |
| 6,942,767 B1 | 9/2005 | Fazzina et al. |
| 6,946,013 B2 | 9/2005 | Alward |
| 6,991,668 B2 | 1/2006 | Towsley |
| 7,008,461 B2 | 3/2006 | Kuki |
| 7,011,803 B2 | 3/2006 | Ichikawa et al. |
| 7,029,265 B2* | 4/2006 | Plammer ............ 425/328 |
| 7,087,109 B2 | 8/2006 | Bredt et al. |
| 7,110,904 B2 | 9/2006 | Lippa et al. |
| 7,112,233 B2 | 9/2006 | Ohno et al. |
| RE39,347 E* | 10/2006 | Ikemoto ............ 428/213 |
| 7,279,022 B2 | 10/2007 | Johnson |
| 7,291,197 B2 | 11/2007 | Costura et al. |
| 7,328,805 B2 | 2/2008 | Price et al. |
| 7,340,887 B2 | 3/2008 | Ante et al. |
| 7,364,676 B2* | 4/2008 | Sucech et al. ............ 264/42 |
| 7,514,010 B2 | 4/2009 | Salmon |
| 7,585,352 B2 | 9/2009 | Dunn |
| 7,655,088 B2 | 2/2010 | Bethani |
| 7,691,319 B2 | 4/2010 | Inoue et al. |
| 7,695,559 B1 | 4/2010 | Chartier et al. |
| 7,736,430 B2 | 6/2010 | Barron et al. |
| 7,749,476 B2 | 7/2010 | Constantz et al. |
| 7,754,169 B2 | 7/2010 | Constantz et al. |
| 8,007,573 B2 | 8/2011 | Bansal et al. |
| 8,210,839 B2* | 7/2012 | Dugand ............ 425/130 |
| 2002/0003112 A1 | 1/2002 | Golden |
| 2002/0014051 A1 | 2/2002 | Fraval et al. |
| 2005/0109023 A1 | 5/2005 | Kudo |
| 2005/0161849 A1 | 7/2005 | Ohno |
| 2005/0232827 A1 | 10/2005 | Merry |
| 2005/0265915 A1 | 12/2005 | Tonkovich et al. |
| 2006/0107658 A1 | 5/2006 | Hiranuma et al. |
| 2006/0162619 A1 | 7/2006 | Bethani |
| 2006/0162929 A1 | 7/2006 | Urbanek |
| 2006/0210765 A1 | 9/2006 | Ohno |
| 2006/0228521 A1 | 10/2006 | Ohno |
| 2006/0251909 A1 | 11/2006 | Beall et al. |
| 2006/0272319 A1 | 12/2006 | Dettling et al. |
| 2006/0287197 A1 | 12/2006 | Maslanka |
| 2007/0006561 A1 | 1/2007 | Brady et al. |
| 2007/0032370 A1 | 2/2007 | Weisensel et al. |
| 2007/0041880 A1 | 2/2007 | Reinsch et al. |
| 2007/0045892 A1* | 3/2007 | Sucech et al. ............ 264/171.13 |
| 2007/0179056 A1 | 8/2007 | Baek et al. |
| 2007/0224565 A1 | 9/2007 | Briselden |
| 2007/0261378 A1 | 11/2007 | Miao et al. |
| 2007/0263477 A1 | 11/2007 | Sudarsan et al. |
| 2007/0263485 A1 | 11/2007 | Yang et al. |
| 2008/0014405 A1 | 1/2008 | Sakamoto |
| 2008/0017572 A1 | 1/2008 | Kudo |
| 2008/0017573 A1 | 1/2008 | Pyzik et al. |
| 2008/0044319 A1 | 2/2008 | Takahashi et al. |
| 2008/0072551 A1 | 3/2008 | Zuberi |
| 2008/0128331 A1 | 6/2008 | Lean et al. |
| 2008/0226346 A1 | 9/2008 | Hull et al. |
| 2008/0230945 A1* | 9/2008 | Abiru et al. ............ 264/212 |
| 2008/0258335 A1* | 10/2008 | Abiru ............ 264/216 |
| 2008/0271422 A1 | 11/2008 | Zawisza |
| 2008/0314242 A1 | 12/2008 | Cochran et al. |
| 2009/0044515 A1 | 2/2009 | Lu et al. |
| 2009/0218722 A1* | 9/2009 | Ochiai ............ 264/214 |
| 2009/0302495 A1* | 12/2009 | Hamamoto et al. ............ 264/216 |
| 2010/0083834 A1 | 4/2010 | Varadaraj |
| 2010/0101464 A1 | 4/2010 | Leach |
| 2010/0143215 A1 | 6/2010 | Caze |
| 2010/0183490 A1 | 7/2010 | Hoke et al. |
| 2010/0251937 A1 | 10/2010 | Murray et al. |
| 2011/0100910 A1 | 5/2011 | Johansen |

FOREIGN PATENT DOCUMENTS

| | | |
|---|---|---|
| JP | A 199632330 A | 1/1966 |
| JP | A 1997025155 A | 1/1977 |
| JP | A 19870363083 A | 1/1987 |
| JP | A 1988143913 A | 1/1988 |
| JP | 11029346 A | 2/1999 |
| JP | 2002248498 A | 9/2002 |
| JP | 2005060159 A | 3/2005 |
| JP | 2005-034797 A | 10/2005 |
| JP | 20060004920 A | 1/2006 |
| KR | 2003002221 A | 1/2003 |

OTHER PUBLICATIONS

U.S. Appl. No. 13/343,713, Ramberg, Aerodynamic Aftertreatment, filed Jan. 5, 2012

U.S. Appl. No. 13/,171,489, Ramberg, Layered Structures, filed Jun. 29, 2011, Office Actions dated Jul. 2, 2013.

U.S. Appl. No. 13/593,564, Ramberg, Substrate Fabrication, filed Aug. 24, 2012, Office Actions dated Jan. 11, 2013; May 10, 2013.

U.S. Appl. No. 13/726,853, Ramberg, Porous Bodies and Methods, filed Dec. 25, 2012, Office Actions dated Oct. 17, 2013.

U.S. Appl. No. 13/743,357, Ramberg, Powertrain Controls, filed Jan. 17, 2013, Office Actions dated Mar. 14, 2014.

U.S. Appl. No. 14/220,146, Ramberg, Substrate Fabrication, filed Mar. 20, 2014.

Response to Sep. 2013 Office Action issued by SIPO (China) in copending PRC (China) Pat. Appln. No. 200880110124.8, which is the National Stage of PCT/US2008/071793.

Response to Office Action dated Sep. 2013 in Japanese patent application JP2010-520197, which is the National Stage of PCT/US2008/071793.

Communication pursuant to Article 94(3) EPC, downloaded from EPO register Feb. 11, 2014, in associated European Patent Application No. 08 796 96.

Mechanical translation of Final Decision received Jun. 2014 in Japanese patent application JP2010-520197, which is the National Stage of PCT/US2008/071793.

Final Decision received Jul. 2014 in Japanese patent application JP2010-520197, which is the National Stage of PCT/US2008/071793.

Recection Decision received Jun. 2014, issued by SIPO (China) in copending PRC (China) Pat. Appln. No. 200880110124.8, which is the National Stage of PCT/US2008/071793.

(56) References Cited

OTHER PUBLICATIONS

Translation of Recection Decision received Jun. 2014, issued by SIPO (China) in copending PRC (China) Pat. Appln. No. 200880110124.8, which is the National Stage of PCT/US2008/071793.
Response to Rejection Decision issued by SIPO (China) in copending PRC (China) Pat. Appln. No. 200880110124.8, which is the National Stage of PCT/US2008/071793, Year: 2014.
Response to Communication pursuant to Article 94(3) EPC,in associated European Patent Application No. 08 796 966, which is the National Stage of PCT/US2008/071793, Year: 2014.
Article 94(3) Communcation from European Patent Office in European Patent Application No. 08 796 966.3, Year: 2014.
U.S. Appl. No. 12/699,736, Ramberg, Porous Bodies and Methods, filed Feb. 3, 2010, Office Actions dated Oct. 20, 2011; Feb. 13, 2012; May 14, 2012; Nov. 2, 2012; Apr. 29, 2013.
U.S. Appl. No. 12/824,070, Ramberg, Powertrain Controls, filed Jun. 25, 2010.
U.S. Appl. No. 12/671,825, Ramberg, Porous Bodies and Methods, filed Aug. 9, 2010, Office Actions dated Jan. 20, 2011; Jun. 13, 2011; Dec. 9, 2011; Jun. 25, 2012.
U.S. Appl. No. 12/756,987, Ramberg, Substrate Fabrication, filed Apr. 8, 2010, Office Actions dated Jan. 9, 2012; May 16, 2012.
U.S. Appl. No. 12/183,917, Ramberg, Porous Bodies and Methods, filed Jul. 31, 2008, Office Actions dated Dec. 21, 2010.
U.S. Appl. No. 13/316,534, Ramberg, Porous Bodies and Methods, filed Dec. 11, 2011, Office Actions dated Jan. 26, 2012; Apr. 26, 2012.
U.S. Appl. No. 13/327,300, Ramberg, Porous Bodies and Methods, filed Dec. 15, 2011, Office Actions dated Jan. 25, 2012; May 3, 2012; Sep. 4, 2012; Feb. 1, 2013; Jun. 27, 2013.
U.S. Appl. No. 13/343,713, Ramberg, Aerodynamic Aftertreatment, filed Jan. 5, 2012.
U.S. Appl. No. 13/171,489, Ramberg, Layered Structures, filed Jun. 29, 2011.
U.S. Appl. No. 13/152,273, Ramberg, Methods, filed Jun. 3, 2011, Office Actions dated Aug. 12, 2011.
U.S. Appl. No. 13/152,275, Ramberg, Porous Bodies and Methods, filed Jun. 3, 2011, Office Actions dated Aug. 12, 2011.
U.S. Appl. No. 13/494,073, Ramberg, Porous Bodies and Methods, filed Jun. 12, 2012, Office Actions dated Sep. 13, 2012.
U.S. Appl. No. 13/593,564, Ramberg, Substrate Fabrication, filed Aug. 24, 2012, Office Actions dated Jan. 11, 2013.
U.S. Appl. No. 13/726,853, Ramberg, Porous Bodies and Methods, filed Dec. 25, 2012.
U.S. Appl. No. 13/743,357, Ramberg, Powertrain Controls, filed Jan. 17, 2013.
Office Action dated Jan. 25, 2012 (U.S. Appl. No. 13/327,300).
Machine translation of JP 2006004920 (Jan. 2006), Yasuda Masahiro; (U.S. Appl. No. 13/327,300).
Office Action dated May 3, 2012 U.S. Appl. No. 13/327,300.
Machine Translation of JP 2002-24898 A (Nitta), published Sep. 3, 2002, (U.S. Appl. No. 13/327,300) May 3, 2012.
Machine Translation of abstract of JP 2005-060159 A (Yamazaki), published Mar. 10, 2005, (U.S. Appl. No. 13/327,300) May 3, 2012.
Grutzeck, et al., "Zeolites Synthesized from Glass F Fly Ash and Sodium Aluminate Slurry" 1997, J. Am. Ceram. Soc., 80 [9] (U.S. Appl. No. 13/327,300) May 3, 2012.
Wang et. Al., "Characterizing the metal Absorption Capacity of a Class F Coal Fly Ash," Environ. Sci., Technol., 2004, 38, 6710-6715, (U.S. Appl. No. 13/327,300) May 3, 2012.
Specifier's Guide for Pervious Concrete Pavement Design, Version 1.2, Colorado Ready Mixed Concrete Association, Centennial, CO. Publication date unknown; downloaded from www.crmca.org Aug. 2009.
Porous Silicon Nitride for Low Pressure Loss DPF, Hayashi, Ichiro; Shinohara, Nobuhiro; Watanabe, Toshinari; Takahashi, Hideo; Reports Res. Lab. Asahi Glass Col, Ltd., 56, pp. 25-27 (2005).

Extrusion of Lightweight Construction Materials from Fly Ash, H.D. DeFord & G.P. Wirtz, Ceram. Eng. Sci. Proc. 14 [1-2] pp. 298-308 (1993).
Characterization of glass ceramics made from incinerator fly ash, T.W. Cheng & Y. S. Chen, Ceramics International, 30, pp. 343-349 (2004).
Characterization of α-cordierite glass-ceramics from fly ash, Yong He, Weimin Chang, Hesheng Cai, Journ. Hazardous Mat. B120, pp. 265-269 (2005).
Cristobalite formation from thermal treatment of Texas lignite fly ash, M.Y.A. Mollah, S. Promreuk, R. Schennach, D.L. Cocke, R. Guler, Fuel, 78, pp. 1277-1282 (1999).
Densification of ashes from a thermal power plant, E. Benavidez, C. Grasselli, N. Quaranta, Ceramics International, 29, pp. 61-68 (2003).
Effect of borate addition on the sintered properties of pulverized fly ash, E.A. Uwe, A.R. Boccaccini, S.G. Cook, C.R. Cheeseman, Ceramics International, 33, pp. 993-999 (2007).
Engineering and environmental properties of thermally treated mixtures containing MSWI fly ash and low-cost additives, A. Polettini, R. Pomi, L. Trinci, A. Muntoni, S. Lo Mastro, Chemosphere, 56, pp. 901-910 (2004).
Flyash as Support for Ni Catalysts in Carbon Dioxide Reforming of Methane, S. Wang, G.Q. Lu, H. Y. Zhu, Chemistry Letters, pp. 385-386 (1999).
Mineralogy and microstructure of sintered lignite coal fly ash, M. Ilic, C. Cheeseman, C. Sollars, J. Knight, Fuel, 82, pp. 331-336 (2003).
Mullite ceramics derived from coal fly ash, J.S. Jung, H.C. Park, R. Stevens, Journ. Mat. Sci. Letters, 20, pp. 1089-1091 (2001).
Physical-mechanical and environmental properties of sintered municipal incinerator fly ash, G. De Casa, T. Mangialardi, A. E. Paolini, L. Piga, Waste Management, 27, pp. 238-247 (2007).
Processing and properties of a glass-ceramic trom coal fly ash from a thermal power plant through an economic process, J. M. Kim, H, S. Kim, Journ. Europ. Ceram. Soc., 24, pp. 2825-2833 (2004).
Sintering of a class F fly ash, J. J. Biernacki, A. K. Vazrala, H. W> Leimer, Fuel, 87, pp. 782-792 (2008).
Synthesis of cordierite from fly ash and its refractory properties, S. Kumar, K.K. Singh, P. Ramachandrarao, Journ. Mat. Sci. Letters, 19, pp. 1263-1265 (2000).
International Search Report and Written Opinion, prepared by KIPO for PCT/US2008/071793, "Porous Bodies and Methods" (Feb. 2009).
Office Action dated Oct. 20, 2011 in U.S. Appl. No. 12/699,736.
Supplemeniary European Search Report received from the European Patent Office for European Patent Application 08796966.3-2113/2180933 (PCT/US2008071793), which is related to PCT Patent Application No. PCT/US08/71793, U.S. Appl. No. 12/183,917 and their related applications, Year: 2012.
Office Action dated Dec. 9, 2011 (U.S. Appl. No. 12/671,825).
An initial study of the fine fragmentation fly ash particle mode generated during pulverized coal combustion, W. S. Seames, Fuel Processing Technology, 81, pp. 109-125 (2003).
Characterization of a glass-ceramic produced from thermal power plant fly ashes, M. Erol, A. Genc, M.L. Ovecoglu, E. Yucelen, S. Kucukbayrak, Y. Taptik, J. Europ. Ceram. Soc., 20, pp. 2209-2214 (2000).
Characterization of the bottom ash in municipal solid waste incinerator, J. M. Chimenos, M. Segarra, M. A. Fernandez, F. Espiell, Journ. Hazard. Materials, A:64, pp. 211-222 (1999).
Crystallization and properties of glasses prepared from Illinois coal fly ash, E. J. DeGuire, S. H. Risbud, J. Mat. Sci., 19, pp. 1760-1766 (1984).
Commercially Useful By-Products of Coal Combustion, M. R. Gottschalk, J. R. Hellmann, B. E. Scheetz, Ceramic Transactions, vol. 119, pp. 125-134 (2001).
Viscous Sintering of Coal Ashes. 2. Sintering Behavior at Short Residence Times in a Drop Tube Furnace, B. Jung & H. Schobert, Energy & Fuels, 6, pp. 59-68 (1992).
Conversion to glass-ceramics from glasses made by MSW incinterator fly ash for recycling, Y.J. Park, J. Heo, Ceramics Int'l., 28, pp. 689-694 (2002).

(56) References Cited

OTHER PUBLICATIONS

Ceramic Diesel Particulate Filters, J. Adler, Int. J. Appl. Ceram. Technol., 2 [6] pp. 429-439 (2005).
Office Action dated Dec. 21, 2010 (U.S. Appl. No. 12/183,917).
Machine translation of KR 2003002221 A, provided by USPTO with Office Action dated Dec. 21, 2010 in U.S. Appl. No. 12/183,917, Jeong, In-Hwa, et al. (orig. cited as Chung H S et al.).
Office Action dated Jan., 2011 (U.S. Appl. No. 12/671,825).
Fabrication and Physical Properties of Honeycomb Type Cordierite Ceramic Filter Using Fly Ash; Sung-Jin Kim, et al., Journal of the Korean Ceramic Society, 43, 351-357 (2006) as provided by USPTO with Office Action dated Jan. 2011 in U.S. Appl. No. 12/671,825.
Mineral Sequestration of CO2 by aqueous carbonation of coal combustion fly ash; G. Montes-Hernandez et al., Journal of Hazardous Materials, 161, 1347-1354 (2008).
Ash to Reduce Trace Element Mobility; T.A. Tawfic, Wyoming Water Resources Center (1995).
Office Action dated Jun. 13, 2011 in U.S. Appl. No. 12/671,825.
Machine translation of JP 11029346, Yamamoto, Haruo, U.S. Appl. No. 13/152,275, Aug. 2011.
Office Action dated Aug. 12, 2011 in U.S. Appl. No. 13/152,273.
Office Action dated Aug. 12, 2011 in U.S. Appl. No. 13/152,275.
Translation of abstract and front matter of KR 2003002221 A, U.S. Appl. No. 12/671,825, Chung, H.S., et al., 2003.
Fabrication or Cordierite Honeycomb from Fly Ash; Sung-Jun Kim, et al., Materials Science Forum vols. 534-536 (2007) pp. 621-624; U.S. Appl. No. 12/671,825.
Office Action dated Feb. 13, 2012 in U.S. Appl. No. 12/699,736.
Translation of EP-0337047, Oct. 1998 (DeBoodt) U.S. Appl. No. 12/699,736, 1998.
Office Action dated Jan. 26, 2012 (U.S. Appl.No. 13/316,534).
Response to Supplementary European Search Report (European patent application No. 08 796 966.3-2113, which is the National Stage application associated with PCT/US08/71793, which is the related PCT application of U.S. Appl. No. 12/183,917, U.S. Appl. No. 12/671,825, and their child applications), Year: 2012.
Advisory Action mailed May 14, 2012 (U.S. Appl. No. 12/699,736).
Office Action Patent Application dated Jun. 25, 2012 (U.S. Appl. No. 12/671,825).
"Flow in Microporous Silicon Carbide: an Experimental and Numerical Study" K. Gjendal & H.B. Madsen, M.S. Thesis, DTU (Denmark) Dec. 1, 2008.
Office Action dated Sep. 13, 2012 (U.S. Appl. No. 13/494,073).
Office Action dated Nov. 2, 2012 (U.S. Appl. No. 12/699,736).
Translation of EP EP 0337047 (DeBoodt, M) as provided by USPTO in Office Action dated Nov. 2 2012 (U.S. Appl. No. 12/699,736).
Office Action and translations dated Dec. 28, 2012 in Japanese patent application JP2010-520197, which is the National Stage of PCT/US2008/071793).
Partial translation of JPA_1988143913, as provided with Office Action dated Dec. 28, 2012 in Japanese patent application JP2010-520197, which is the National Stage of PCT/US2008/071793).
Machine translation of JHA_1997025155, as provided with Office Action dated Dec. 28, 2012 in Japanese patent application JP2010-520197, which is the National Stage of PCT/US2008/071793).
Machine translation of JPA_1996332330, as provided with Office Action dated Dec. 28, 2012 in Japanese patent application JP2010-520197, which is the National Stage of PCT/US2008/071793).

Machine translation of JPA_19870363083, as provided with Office Action dated Dec. 28, 2012 in Japanese patent application JP2010-520197, which is the National Stage of PCT/US2008/071793).
Office Action and counsel-provided translation dated Jan. 16, 2013, issued by SIPO (China) in copending PRC (China) Pat. Appln. No. 200880110124.8, which is the National Stage of PCT/US2008/071793.
Office Action dated Feb. 1, 2013 (U.S. Appl. No. 13/327,300).
Office Action dated Sep. 4, 2012 (U.S. Appl. No. 13/327,300).
Office Action dated May 10, 2013 (U.S. Appl. No. 13/593,564).
Office Action dated May 16, 2012 in U.S. Appl. No. 12/756,987.
Office Action dated Jan. 9, 2012 (U.S. Appl. No. 12/756,987).
"Changing the Substrate Technology to met future Emission Limits", Lorenzo Pace and Manuel Presti, Emitec gmbh, downloaded fromhttp://www.emitec.com/en/bibliothek-downloads/overview. html on Feb. 21, 2012.
Metal Supported Catalysts for Large-Volume Engine Applications: From Designing to Recycling 4th AVL Large Engine Techdays May 5 & 6, 2010 Dr.-Ing. Raimund Müller Dipl.-Ing. Oswald Holz Dr.-Ing. Andreas Scheeder, EMITEC Gesellschaft für Emissionstechnologie mbH Emitec gmbh, downloaded fromhttp://www.emitec.com/en/bibliothek-downloads/overview.html on Feb. 21, 2012.
"Application of PM-Metalit® and SCRi® Systems" Rolf Brück, Klaus Müller-Haas, Oswald Holz, Peter Hirth EMITEC Gesellschaft für Emissionstechnologie mbH Robert-Gilles Entlesberger,Thomas Cartus AVL List GmbH, downloaded from http://www.emitec.com/en/bibliothek-downloads/overview.html on Feb. 21, 2012.
Development of an integrated NOx an PM Reduction Aftertreatment System: SCRiTM for Advanced Diesel Engines. Michael Rice, Jan Kramer, Emitec Inc. Dr. Raimund Mueller, Klaus Mueller-Haas, Emitec GmbH, SAE World Congress, Apr. 2008, downloaded from http://www.emitec.com/en/bibliothek-downloads/overview. html on Feb. 21, 2012.
Office Action dated Jan. 11, 2013 (U.S. Appl. No. 13/593,564).
Final Office Action dated Apr. 29, 2013 (U.S. Appl. No. 12/699,736).
Communication pursuant to Article 94(3) EPC, downloaded from EPO register May 2, 2013, in associated European Patent Application No. 08 796 966.
Final Office Action dated Jun. 27, 2013 (U.S. Appl. No. 13/327,300).
Response to SIPO Office Action (PRC, China) for copending Chinese patent application No. 200880110124.8 filed Jun. 2013.
Response to JPO Office Action (Japan) for copending Japanese patent application No. JP2010-520197 filed Jun. 2013.
Response to Article 94(3) Communcation from European Patent Office in European Patent Application No., Year: 2013.
Office Action dated Sep. 2013, issued by SIPO (China) in copending PRC (China) Pat. Appln. No. 200880110124.8, which is the National Stage of PCT/US2008/071793.
Office Action dated Sep. 2013 in Japanese patent application JP2010-520197, which is the National Stage of PCT/US2008/071793.
Response submitted to IP Australia in Australian Patent Application No. 2008284107, which is the AU National stage of PCT/US2008/071793, Year: 2012.
Mechanical Translation of JP2005-034797A, Year: 2005.

* cited by examiner

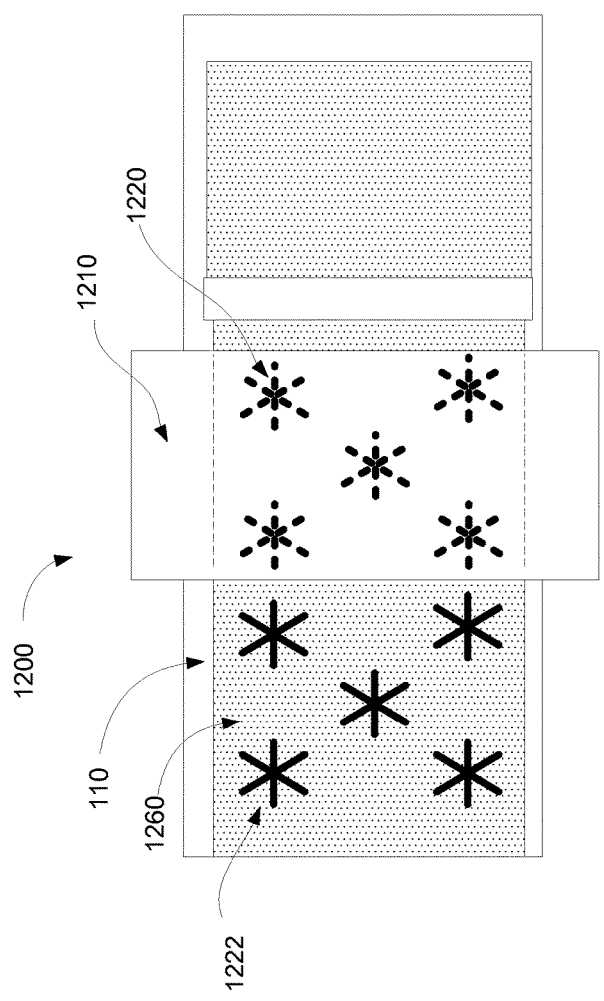
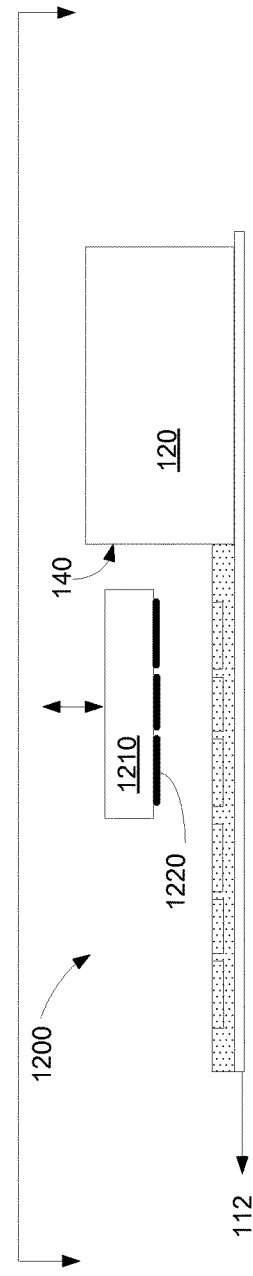
FIG. 12A
FIG. 12B

LAYERED STRUCTURES

CROSS REFERENCE TO RELATED APPLICATIONS

This description claims the priority benefit of U.S. provisional patent application No. 61/359,825, filed Jun. 30, 2010, the disclosure of which is incorporated herein by reference. This description is related to U.S. patent application Ser. No. 12/756,987, filed Apr. 8, 2010, now issued as U.S. Pat. No. 8,277,743, which claims the priority benefit of U.S. provisional patent application No. 61/167,857, filed Apr. 8, 2009, the disclosures of which are incorporated herein by reference. This description is related to U.S. patent application Ser. No. 12/183,917, filed Jul. 31, 2008, and now issued as U.S. Pat. No. 7,981,375, Ser. No. 12/756,987, filed Apr. 8, 2010, now issued as U.S. Pat. No. 8,277,743, the disclosures of which are incorporated herein by reference.

BACKGROUND

1. Technical Field

The present invention relates generally to forming bodies, and more particularly to forming tapes and fabricating bodies from tapes.

2. Description of Related Art

Many reactions involving fluids (e.g., gases, liquids, and the like) entail the use of reactors. Most reactions are temperature dependent, and so a reactor (or zone within a reactor) may be required to have certain chemical, mechanical, thermal, and other properties at a temperature of interest to the reaction. Some reactions are performed at high temperatures (e.g., above 100 C, above 400 C, above 800 C, above 1100 C, or even above 1500 C), and so may require reactors having appropriate properties at the temperature of interest. Many reactions require porous bodies, that may have controlled surface area, porosity, permeability, and the like.

Some bodies benefit from channels passing through the body. Channels may provide for fluid flow, reduce mass, change optical properties, and otherwise affect a body. Forming channels in a body may be challenging, particularly when a large number of small channels are to be formed in a large body.

Abatement of exhaust streams (e.g., from engines, turbines, power plants, refineries, chemical reactions, solar panel manufacturing, electronics fabrication, and the like) may entail reactions at high temperatures. In some cases, the exhaust stream may heat a reactor (e.g., a catalytic converter on a vehicle), and so proper reaction (e.g., abatement) may require a reactor design that maintains a desired temperature or range of temperatures, notwithstanding that the source of heat to the reactor is via the exhaust stream. The use of exhaust heat to maintain a reactor temperature may result in impaired performance under some conditions. For example, a catalytic converter may inefficiently decompose pollutants prior to having been heated to an appropriate temperature (e.g., when the vehicle is cold). A diesel particulate filter that filters carbonaceous particles (e.g., soot) may require "regeneration" (e.g., the creation of a temperature and oxygen partial pressure sufficient to oxidized accumulated soot).

Exhaust abatement systems are often fabricated from refractory materials (such as ceramics) which are generally not malleable. Reactor fabrication often requires extruding a paste containing the refractory material into a desired shape and firing the extruded part. Forming small channels and/or thin walls in an extruded body typically requires a complex, expensive die combined with a high pressure extruder. To form hollow channels, the die uses suspended internal features that shape the insides of the channels, and small "spiders" or "bridges" to suspend these features in place. To form thin walls, the paste must be extruded through thin grooves, which resist the flow of a paste that is viscous enough to retain its shape after extrusion. High extrusion pressures are required to push paste through the fine grooves, and the bridges holding the suspended "channel mandrels" are generally small, so that the paste may flow around the bridges and "knit" back together to form a contiguous wall. As a result, the cross sectional area of an extruded part (e.g., a honeycomb) is often limited by the mechanical properties of the die (e.g., the die's ability to withstand extrusion pressure without deforming). Fabrication of large bodies (e.g., >1000 square inches cross section) requires extruding multiple small bodies (e.g., 25 to 100 square inches cross section) and packing them together in a bricklike fashion.

Extrusion dies may be expensive to machine, wear out during use, and require complicated cleaning apparatus and procedures. Often these costs are associated with the die having a cross sectional area that is large in two lateral dimensions (e.g., the die makes an extruded honeycomb of 6" diameter or 5" square). A depth of the die (in a direction parallel to the extrusion direction) must be large enough that extruded pastes knit together around internal features that form channels in the extruded part. This depth may make cleaning difficult and increases machining cost.

SUMMARY OF THE INVENTION

Systems and methods are disclosed. A method may comprise providing a carrier, which may be a flexible carrier and/or a rigid carrier. A carrier may be textured. A carrier may include a thin, wide film (e.g., a teflon film), a paper, and the like. A first material (e.g., a shear thinning material) is provided, and may be formed into a textured tape on the carrier. The tape may be characterized by a tape width that is more than ten times a thickness of the tape (e.g., a thickness in an untextured region). The tape may have a tape width that is more than 100 times, or even more than 1000 times the thickness. In some cases, the tape is more than 10,000 times wider than it is thick. An exemplary tape may be 0.5-2 mm thick and more than 1 m wide. Some tapes may have similar widths and thicknesses. Some tapes may be thicker than they are wide. Some tapes may be wider than they are thick (e.g., twice as wide).

A textured tape may have a feature on at least one (and sometimes both) surfaces. A feature may include a wall, a channel, and/or another structure. In some cases, the feature is characterized by a height or a depth (from bottom of the feature to top) that is at least 50% of the thickness of the tape (as measured in a region not having the feature). In some cases, a feature may be higher than the tape is thick. In some embodiments, a tape may be 400 microns to 4 mm thick, and a feature may be approximately 3 mm high. A feature may include a wall or a trench, which may be higher (or deeper) than it is thick. In some embodiments, a plurality of walls are between 300 microns and 900 microns thick, and are between 2 mm and 8 mm high.

Some forming methods include tape casting. In some cases, tapes are cast using a toothed blade, and texture on the tape includes a wall formed by a space between teeth on the toothed blade. Teeth may be separated by a spacing whose shape defines a wall in a cast tape. In some cases, the teeth have a teeth height that is greater than the spacing between teeth, greater than twice the spacing between teeth, or even greater than 5× the spacing between teeth.

A toothed blade may include spaces between teeth that have portions configured to create deformation zones in a cast tape. A deformation zone may characterize a portion of the space between teeth that forms a corresponding region in a cast tape (e.g., a thin region of a wall). For select paste viscosities and/or strength characteristics, the region associated with the deformation zone may preferentially deform after casting while regions outside the deformation zone do not deform. In some cases, a deformation zone may form a region that preferentially slumps, whereas other regions do not preferentially slump.

Some methods include casting a tape in a first direction of a blade moving with respect to the carrier. In some aspects, the blade and carrier move in two directions, or even three directions, with respect to each other. A blade may be oscillated. A die may be oscillated. A portion of the carrier (e.g., beneath the blade) may be oscillated. In some cases, a blade or portion is actuated in a manner that induces localized stress (e.g., shear stress) in a material being formed. Localized shear stress (e.g., induced by a blade, embossing pattern, or portion of the carrier) may induce localized shear-thinning of the material, which may facilitate texturing. Removal of the shear stress (e.g., in a region away from the localized region) may result in the material reverting to a high viscosity state, allowing the texture to remain.

Some materials (e.g., pastes) may be shear thinning, and may be characterized by a first viscosity at a low shear stress (or shear rate). The first viscosity may be above 10 Pa-s, above 100 Pa-s, above 1000 Pa-s, above 1E4 Pa-s, above 1E5 Pa-s, or even above 1E6 Pa-s. The second viscosity may be lower than the first viscosity. The second viscosity may be below 10% of the first viscosity. In some cases, the second viscosity may be below 10 Pa-s, below 1 Pa-s, below 0.1 Pa-s, or even below 0.01 Pa-s. The first viscosity may be described as a viscosity at an unstressed or low stress (or low shear rate), (e.g., less than 1 s$^{-1}$, less than 0.1 s$^{-1}$, or even less than 0.01 s$^{-1}$) and a second viscosity at a high shear rate (e.g., greater than 10 s$^{-1}$, greater than 100 s$^{-1}$, or even greater than 1000 s$^{-1}$)). A second viscosity may be measured at a shear rate that is twice, 10×, 100×, 1000×, 10,000×, or even 100,000× the first shear rate. In some cases, the second viscosity is below 20% of, below 10% of, below 1% of, or even below 0.1% of the first viscosity. Some materials may be shear-thickening. Some materials display Bingham-plastic behavior. Some materials may display thixotropic behavior.

Some pastes include materials that bond cementitiously. Solidification of a cementitious material may be controlled (e.g., with agitation in a hopper, with a retarder, with temperature, and the like) such that it is castable, then solidifies after having been formed into a tape. In some cases, a paste includes one or more fly ashes, particularly a fly ash having D90 below 100 microns. A paste may include a fugitive phase whose subsequent removal leaves a desired porosity. Some pastes include a binder, which may be a binder that crosslinks (e.g., cures) under radiation (e.g., UV light).

Maintaining fine features of texture include using a high viscosity paste to prevent collapse of the features after formation. Casting and/or embossing fine features using a high viscosity paste may be enhanced by imparting localized stress to induce shear thinning of the paste. Localized shear thinning may be used to cast, emboss, or otherwise form fine features that are maintained after the stress is removed. In some embodiments, a material may be cast using a pressurized hopper, which may provide for the application of hydrostatic and/or uniaxial pressure to the material being cast. In some cases, a flat tape (or a "floor tape") is formed and embossed to form a textured tape. An embossing apparatus may apply pressure (e.g., oscillatory pressure) in a manner that locally thins the tape to form the texture.

A tape and/or a plurality of tapes may be layered. Tapes may be stacked, rolled, and/or otherwise assembled to form bodies. Tapes and/or bodies may be fired. In some cases, a tape and/or body may be fired at a temperature between 300 C and 1000 C. A tape and/or body may be fired at a temperature above 1000 C. In some cases, a tape and/or body is fired at a temperature between 700 C and 1300 C, including between 800 C and 1200 C. Some tapes and/or bodies are fired at temperatures between 1000 C and 1200 C. Some tapes and/or bodies are fired at temperatures above 1300 C, including between 1300 C and 2200 C, including between 1400 C and 1900 C.

Bodies may be fabricated from tapes having channels. A channel may be formed in a body by (for example) stacking a first tape having a first part of the channel (e.g., the ceiling) on top of a second tape having a second part of the channel (e.g., the walls and floor). In some cases, channels may be between 1 cm and 10 cm in size (e.g., between 1 cm$^2$ and 100 cm$^2$ cross sectional area). In some cases, channels may be between 1 mm and 1 cm in size (e.g., below 1 cm$^2$ cross sectional area). In some cases, channels may be greater than 10 cm in size. Channels may be separated by walls, which may be thicker or thinner than a dimension characterizing the channels. In some embodiments, a body includes channels having cross sectional areas of 1 mm$^2$ to 1 cm$^2$, separated by walls having a thickness between 100 microns and 2 mm, including between 300 microns and 800 microns. A body may be between 30% and 80% porous, including between 40% and 70% porous. A body may be characterized by a porosity for which the median pore diameter is between 2 and 30 microns, including between 4 and 15 microns. Some bodies have a median pore diameter between 1.5 and 6 microns. In some cases, a body includes a first portion having a median pore size between 10 and 40 microns, and a second region having a median pore size between 2 and 10 microns. In some cases, the first region and second region have different compositions. The first region may include a majority of a first material (e.g., a first fly ash) and the second region may include a majority of a second material (e.g., a second fly ash).

Some tapes may be textured using an injector. An injector may inject a material onto a tape. An injector may apply localized stress to a portion of a tape in a manner that creates (e.g., embosses) texture. An injector (e.g., a knife edge or probe) may be used to pinch or otherwise deform a wall. In some cases, an injector causes deformation of a portion of a tape associated with a deformation zone. An injector may include a thin sheet that "skims" or otherwise applies pressure to the tape.

A body may comprise a tape fabricated according to various methods. In some cases, a system for treating a fluid incorporates a body. A method may comprise treating a fluid using a body fabricated according to disclosed methods.

BRIEF DESCRIPTION OF THE DRAWINGS

FIGS. 12A-B illustrate an embossing apparatus, according to some embodiments.

DETAILED DESCRIPTION OF THE INVENTION

Figure 1A:
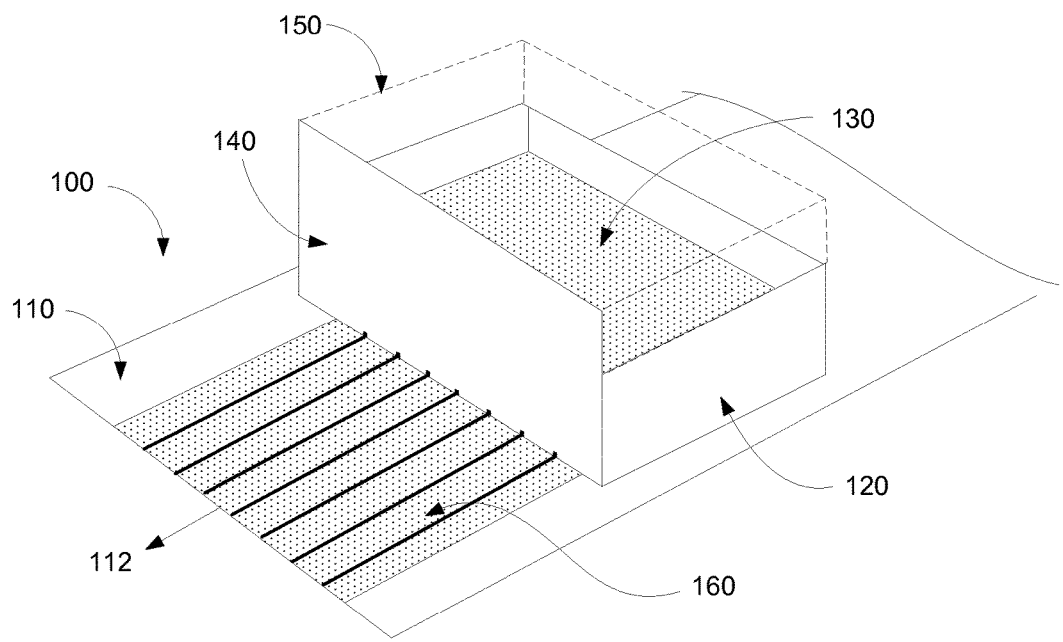
FIG. 1A illustrates an exemplary tape casting apparatus, according to some embodiments.

Various aspects provide for reactors and the fabrication of reactors. Some reactors include surfaces that provide for heterogeneous reactions involving a fluid passing over and/or through the reactor. In some embodiments, a reactor may be fabricated from an assembly of tapes. A tape may be substantially longer (e.g., 10×, 100×, or even 1000×) longer in a first direction (e.g., a width) with respect to a second direction (e.g., a height). In some cases, tapes are stacked to form a reactor. One or more tapes may be rolled, coiled, and/or otherwise assembled to form a reactor. A reactor may include one or more channels, which may be formed by texturing the tapes and assembling the textured tapes to form the channels. In some embodiments, a tape may have at least a floor and a side, and assembling tapes may create channels having at least a top, floor, and two sides. In some cases, a tape may have a channel having a floor, a side (or even two sides) and a back, and assembling tapes may create channels having a top, floor, two sides, and a back.

Some fluids require a plurality of reactions and/or reactors. For example, a diesel exhaust mitigation system may include a diesel oxidation reactor (e.g., to oxidize CO and/or hydrocarbons), a particulate filter, and a reactor to remove NOx (oxides of Nitrogen). A diesel particulate filter may include a reactor (e.g., upstream of the filter) to form a species (e.g., NOx) to react with filtered particulates. In some cases, reactors are disposed in series, and so an exhaust system may include several components, each having an inlet and outlet, with the outlet of one component connected to the inlet of another component. In some embodiments, first textured channels form a first reactor, second textured channels form a second reactor, and the first textured channels are in fluid communication with the second textured channels.

Reactors may be fabricated from metals, ceramics, and the like. In some cases, a tape may be fabricated using tape casting, roll compacting, embossing, extrusion, and other methods dealing with pastes. A paste may include a liquid, a particulate material (e.g., a ceramic, fly ash, metal, and the like) and optionally a binder. Some pastes are shear-thinning. Some pastes are thixotropic. Some binders may be UV-curable. Heat and/or hot air may be incorporated into casting and/or rolling procedures. A dispersant, surfactant, and/or other additive may be incorporated into a paste.

In some embodiments, a shear thinning material is used to form a textured tape. A high shear stress or shear rate (at which the shear thinning material has low viscosity) may be generated in a texturing process. Removal of the high shear stress may result in the shear-thinning material having a sufficiently high viscosity that the texture is maintained. In some implementations, a blade may generate localized high shear stress (beneath the blade) during a tape casting process, whose removal (after the cast material passes beneath the blade) results in the material reverting to a "stiff" state representative of its viscosity at low shear stress.

FIG. 1A illustrates an exemplary tape casting apparatus, according to some embodiments. Apparatus 100 includes a carrier 110, which may be a flexible carrier (e.g., a polymer tape such as kapton, mylar, nylon, polyethylene, PET, and the like). In some cases, carrier 110 is stiff (e.g., a thick polymer, metal, glass, ceramic, and the like). Hopper 120 includes a material 130 to be formed into a tape. A blade 140 (e.g., a doctor blade) is disposed a desired vertical distance 144 (FIG. 1B) from carrier 110, forming a gap through which material 130 may be cast onto carrier 110. In some implementations, hopper 120 may include a pressure head 150, which may pressurize material 130 (e.g., hydrostatically, vertically, and/or horizontally). In some cases, hopper 120 may include an apparatus to mechanically agitate material 130 (e.g., an oscillating probe, a stirrer, and the like).

Carrier 110 and blade 140 may move, with respect to each other, to tape cast a tape 160 comprising material 130. In exemplary FIG. 1A, carrier 110 moves in tape direction 112 with respect to blade 140 and hopper 120. In some implementations, blade 140 and hopper 120 may be moved (e.g., opposite tape direction 112).

Some pastes include a binder, which may be a binder that crosslinks (e.g., cures) under heat or light (e.g., infrared light, UV light, hot air, and the like). In some embodiments, a casting and/or embossing apparatus may include a light source after a texturing process (e.g., after a tape cast with toothed blade). A binding polymer may be cross linked with the light source after texturing and before the texture slumps or otherwise deforms. In some cases, a UV LED (e.g., an array of LEDs) and/or UV laser is directed at a portion of the tape immediately after the texturing process. A paste comprising a UV curable binder may have a sufficiently high viscosity that texture is maintained for the short period of time (e.g., less than 5 seconds, less than 1 second, or less than 0.1 seconds) between texturing and cross linking. In some cases, a tape is cast with a deformation zone, and the binder is cross linked before the deformation zone deforms. In some cases, the binder is cross linked after the deformation zone deforms.

Figure 1B:
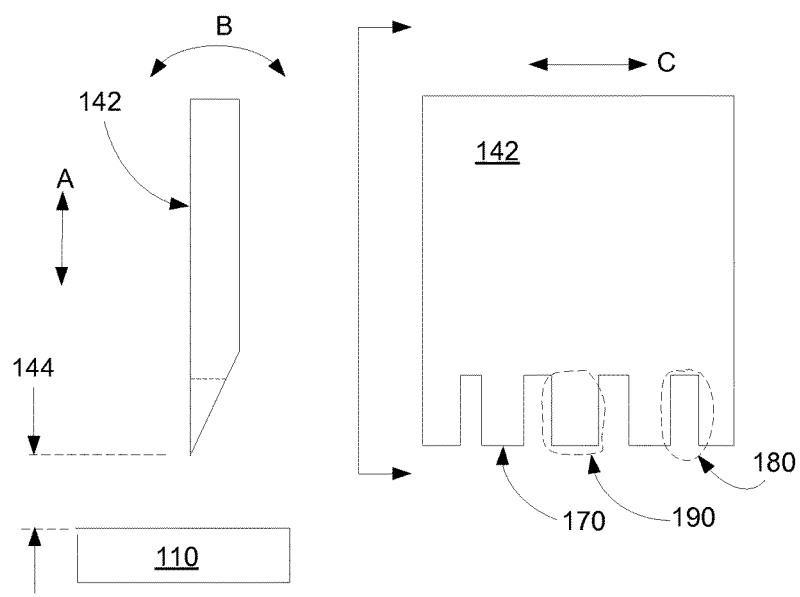
FIG. 1B illustrates a toothed blade, according to some embodiments.

FIG. 1B illustrates a toothed blade, according to some embodiments. Toothed blade 142 may include one or more teeth 170, which may texture a tape during tape casting using toothed blade 142. In some cases, toothed blade 142 may texture a tape to form channels. At least a portion of toothed blade 142 may be characterized by a wall shape 180, which may characterize a shape of a wall formed in a tape by the space between teeth of toothed blade 142. At least a portion of toothed blade 142 may be characterized by channel shape 190, which may characterize a shape of a channel formed in a tape by a tooth of toothed blade 142.

A blade (e.g., toothed blade 142) may be disposed a vertical distance 144 from carrier 110. During tape casting, material may pass beneath the blade to form a tape having a floor, the floor having a thickness associated with distance 144. In some embodiments, a bottom of the floor of one tape may form a ceiling of a channel of another tape (e.g., when the tapes are stacked).

A blade (e.g., toothed blade 142) may be moved (e.g., in directions A, B, C). In some cases, a blade is moved monotonically (e.g., across the tape during tape casting). In some cases, a blade is moved in an oscillatory fashion (e.g., at tens of Hz, 100's of Hz, kHz, ultrasonically, and the like). A vertical angle of the blade (with respect to carrier 110) may be adjusted (e.g., with B). In some cases, this angle changes during tape casting. Some blades include a beveled bottom edge (e.g., as shown in FIG. 1B).

A blade may be fabricated from a metal, a plastic, a glass, a ceramic and/or a composite thereof. A blade may be coated (e.g., teflon coated, anodized, and the like). In some embodiments, a blade may be made using electrodischarge machining, and may be coated after machining. A blade may be coated by line of sight coating methods (e.g., PVD). A blade may be coated using CVD, which may include plasma assisted CVD.

Figure 2:
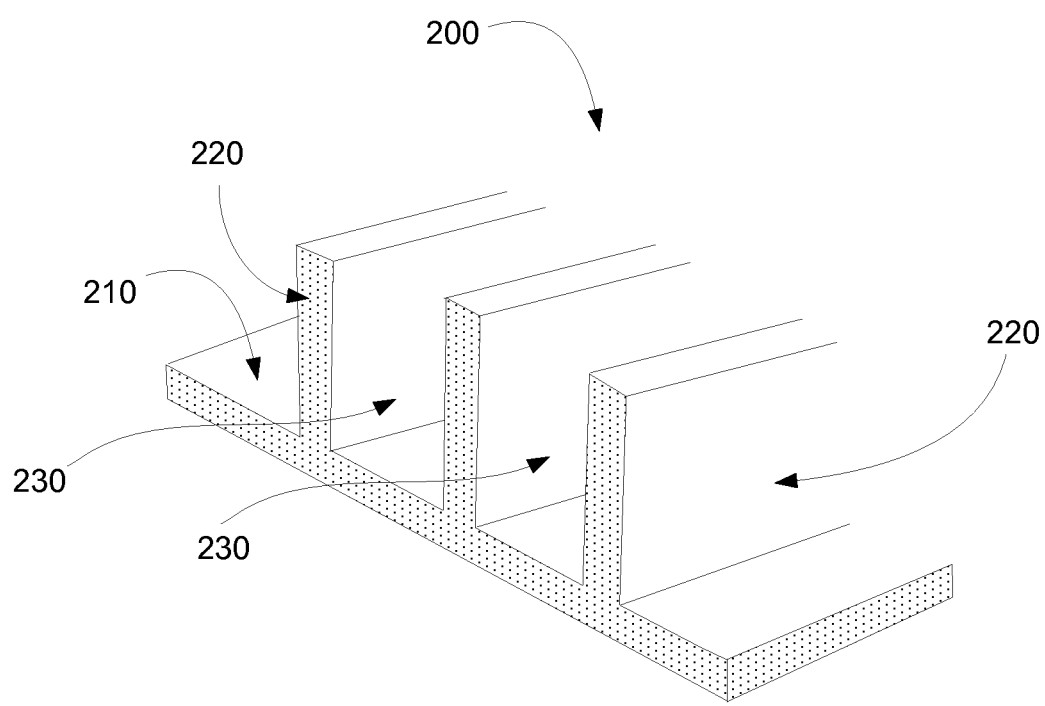
FIG. 2 illustrates an exemplary textured tape, according to some embodiments.

FIG. 2 illustrates an exemplary textured tape, according to some embodiments. Exemplary tape 200 includes a floor 210 and one or more walls 220. Walls 220 may form one or more channels 230. A cross sectional shape associated with a wall 220 may be at least partially defined by a wall shape 180 (FIG. 1B), and a cross sectional shape associated with a channel 230 may be at least partially defined by a channel shape 190 (FIG. 1B). In some cases, a channel may be oriented in substantially the same direction as a tape was cast (e.g., tape direction 112, FIG. 1A). In some cases, a channel may be oriented at least partially at an angle (e.g., to tape direction 112). In some embodiments, a blade is moved laterally during tape casting (e.g., orthogonally) with respect to a tape direction, to create an angled channel having an angle characterized by the relative casting and lateral velocities of the blade with respect to the carrier.

Figure 3A:
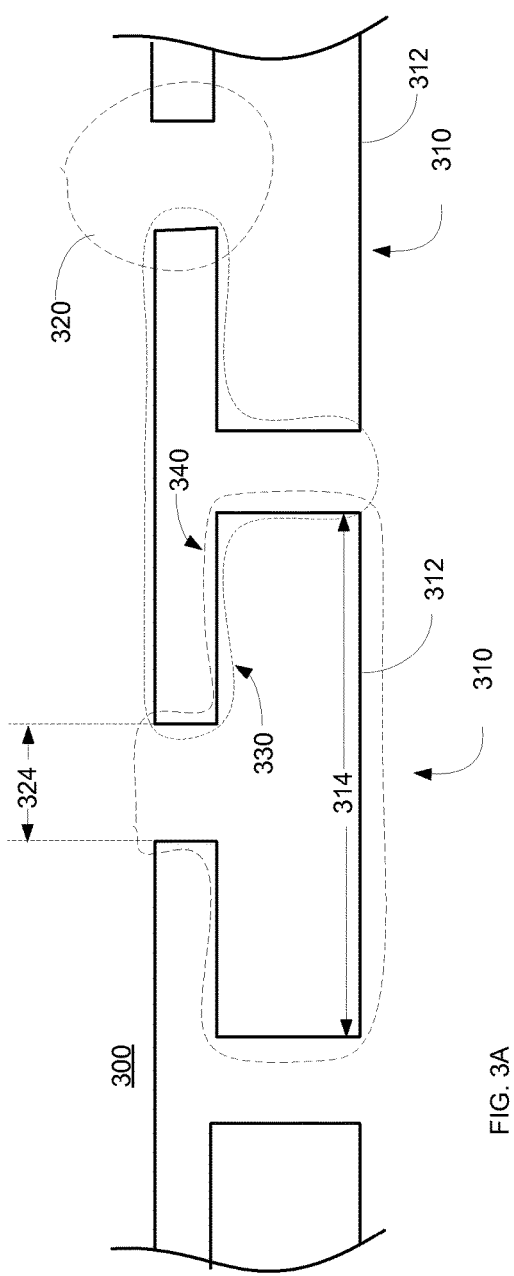
FIG. 3A illustrates some exemplary features of a toothed blade, according to some embodiments.

FIG. 3A illustrates some exemplary features of a toothed blade, according to some embodiments. Toothed blade 300 includes teeth 310. Some toothed blades may be characterized by one or more edges (e.g., bottom edge 312). Some toothed blades may be characterized by one or more roots 320, which may describe a shape of an attachment portion between a tooth and the rest of the blade. In some embodiments, a width 314 of bottom edge 312 is greater than a width 324 of root 320. In some cases, width 314 is greater than 50% larger than width 324. In some cases, width 314 is greater than 2×, or even 3× width 324. In some embodiments, a width 324 is greater than width 314. In some cases, width 324 is greater than 50% larger than width 314. In some cases, width 324 is greater than 2×, or even 3× width 314.

FIG. 3A illustrates exemplary channel shape 330 and wall shape 340. The shapes and orientation of teeth 310 may result in a cast tape having a channel with channel shape 330. The open region between teeth 310 may be described as wall shape 340, and may result in a cast tape with a wall between channels having wall shape 340.

Figure 3B:
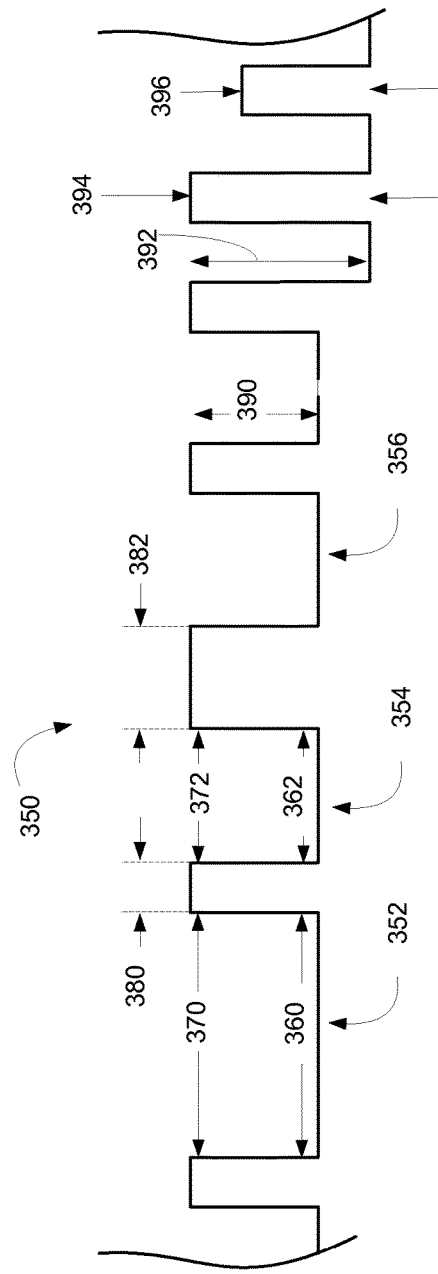
FIG. 3B illustrates several exemplary features of a toothed blade, according to some embodiments.

FIG. 3B illustrates several exemplary features of a toothed blade, according to some embodiments. Toothed blade 350 may include a plurality of teeth 352, 354, 356, and the like. A toothed blade may include teeth having the same and/or different edge widths 360 and 362. A toothed blade may include teeth having the same and/or different root widths 370 and 372. A toothed blade may include teeth having the same and/or different spacings 380 and 382 between teeth. A spacing between teeth may be between 5 mm and 10 cm in some applications. In some cases, a spacing between teeth may be between 100 microns and 2 mm, including between 300 microns and 900 microns. A toothed blade may include teeth having the same and/or different teeth heights 390 and 392 (e.g., one tooth may extend further down than another tooth). In some cases, a tooth height may be 500 microns to 5 mm, including between 1 and 3 mm. A tooth height may be greater than a spacing between teeth, and in some cases is 50% larger, 2× larger, 5× larger, or even 10× larger. In some cases, a tooth height may be less than a spacing between teeth. In some embodiments, a spacing between teeth is between 400 microns and 1 mm, and a tooth height is between 3 mm and 1 cm.

A toothed blade may include teeth having the same and/or different distances 394 and 396 from their bottom edges to their roots. In some embodiments, a tooth may substantially extend to the bottom of the floor of a cast tape (e.g., scraping the carrier).

Figure 4A:
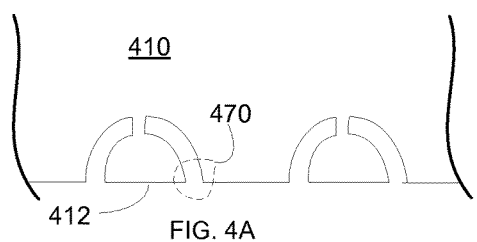
FIGS. 4A-F illustrate exemplary tooth configurations, according to some embodiments.
Figure 4B:
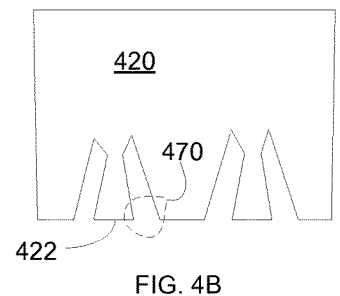
Figure 4C:
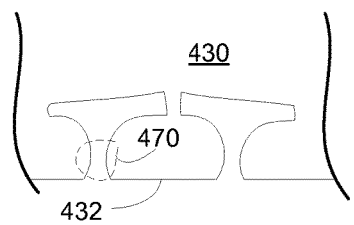
Figure 4D:
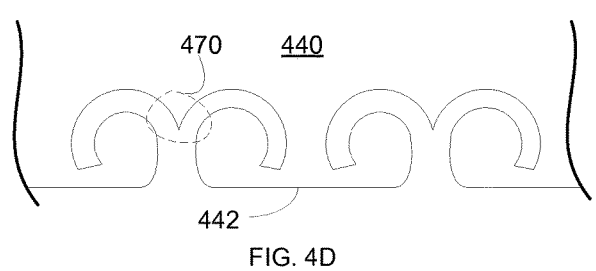
Figure 4E:
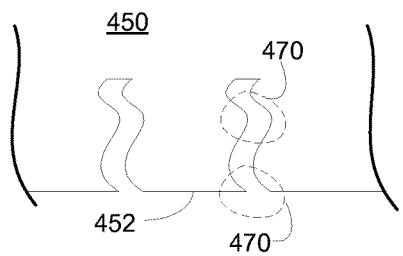
Figure 4F:
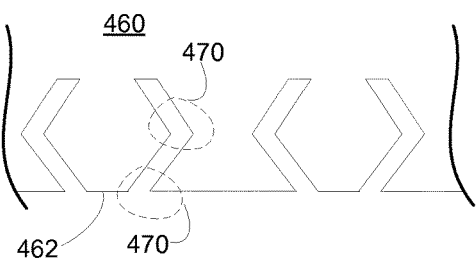

FIGS. 4A-F illustrate exemplary tooth configurations, according to some embodiments. FIG. 4A illustrates a toothed blade 410 having teeth 412. FIG. 4B illustrates a toothed blade 420 having teeth 422. FIG. 4C illustrates a toothed blade 430 having teeth 432. FIG. 4D illustrates a toothed blade 440 having teeth 442. FIG. 4E illustrates a toothed blade 450 having teeth 452. FIG. 4F illustrates a toothed blade 460 having teeth 462. Some teeth may include curved edges (e.g., teeth 412, 432, 442, 452). Some blades may include a wall channel shapes (e.g., a space between teeth) having a kink and/or other angled change in shape (e.g., blade 460). Some blades may create walls in a cast tape that are slightly off-vertical with respect to a floor of a cast tape (e.g., blade 420). Some blades may create walls having portions that are substantially horizontal (e.g., blade 440). Some blades create "tee-shaped" walls in cast tapes (e.g., blades 430, 440). Some blades may have a wall shape that creates a wall that forms more than 20% of, more than 30% of, more than 40% of, more than 50% of, a majority of (e.g., more than 60% of, more than 70% of, more than 80% of, or even more than 90% of) a channel (e.g., blade 300, FIG. 3).

A blade may include teeth designed to create texture (e.g., walls) having a cross sectional shape defined by spacing between teeth in the blade. In some implementations, a blade may be configured to fabricate a portion of a wall that will deform under certain conditions. In some cases, this portion may deform after casting the wall (and in some cases, after stacking tapes together). The tooth design and spacing between teeth may be configured such that a first portion of a cast wall (e.g., a thin part) deforms after casting and a second portion of the cast wall (e.g., a thick part) does not deform after casting.

In some cases, a wall may be shaped to create a bending moment or other stress (e.g., due to gravity) on a portion, and this portion may preferentially deform. A portion of a wall (or other feature) that is designed to controllably and/or preferentially deform may be described as a deformation zone. Deformation zones 470 may be created using teeth and/or paste designs. A deformation zone 470 may describe a portion of a blade, that yields an associated cast portion in a cast tape, that preferentially deforms after casting. In some cases, a deformation zone 470 may be associated with a portion of a wall of an associated cast tape for which a bending moment (e.g., due to gravity) is maximized. In FIGS. 4A-F, examples of possible deformation zones 470 are provided for illustrative purposes; the occurrence (or not) of deformation in the cast tape is generally be a function of both wall shape and paste properties (e.g., viscosity).

Figure 5:
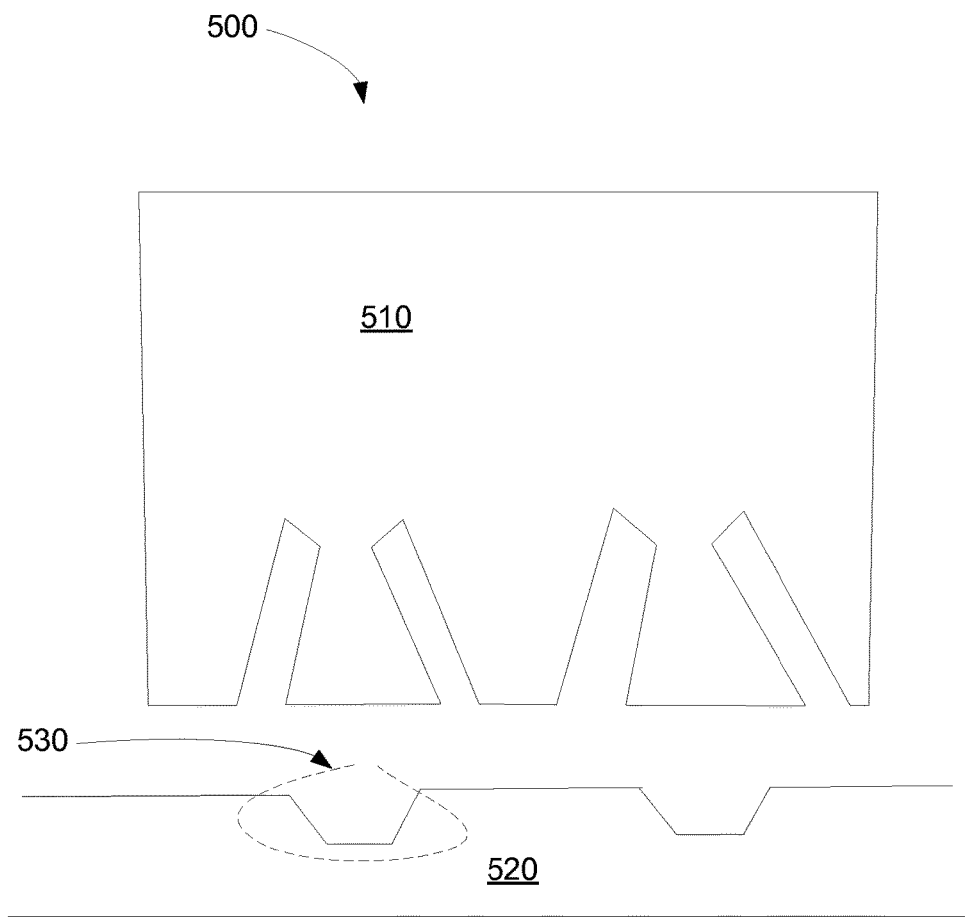
FIG. 5 illustrates a textured carrier, according to some embodiments.

FIG. 5 illustrates a textured carrier, according to some embodiments. Apparatus 500 may include a blade 510 (in this example, a toothed blade) configured to cast a tape on carrier 520. Carrier 520 includes a texture 530, which may receive cast material and result in a cast tape having a textured bottom surface. In some cases, a bottom surface of a cast tape is shaped to fit the top surface of another cast tape. In some cases, a tape is cast to form a floor and walls of a channel on a top surface and a ceiling of a channel on the bottom surface. Some carriers may have a roughened, random, or otherwise tortuous surface onto which a tape is cast. A carrier may be porous. Some carriers may include paper, felt, cardboard, and other fibrous materials. A carrier may have a directionality associated with a texture on its surface (e.g., a sharkskin or fishscale pattern) in which friction (or resistance to paste flow) changes according to direction with respect to the carrier. In some cases, a carrier may be oriented such that the rough direction is oriented in the same direction as a casting or taping direction. In some cases, the rough direction is oriented in the opposite direction as the casting or taping direction. The rough direction may be oriented at an angle (or even orthogonal to) the casting or taping direction.

Figure 6A:
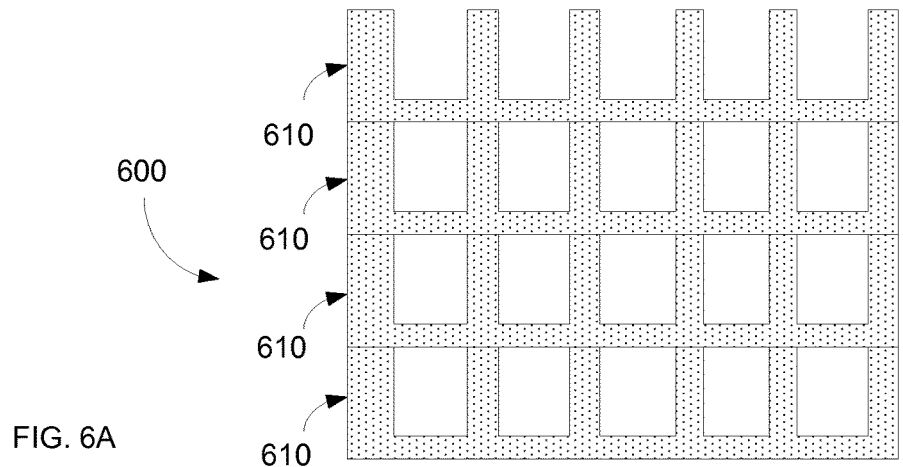
FIGS. 6A-C illustrate exemplary stacked structures, according to some embodiments.
Figure 6B:
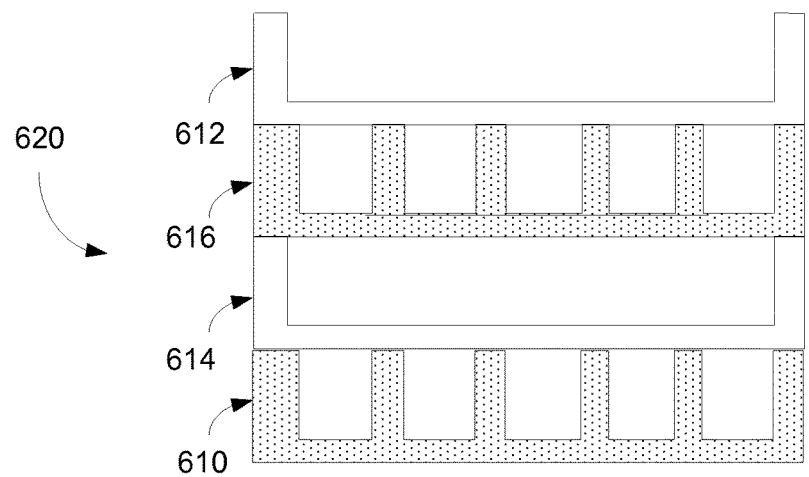
Figure 6C:
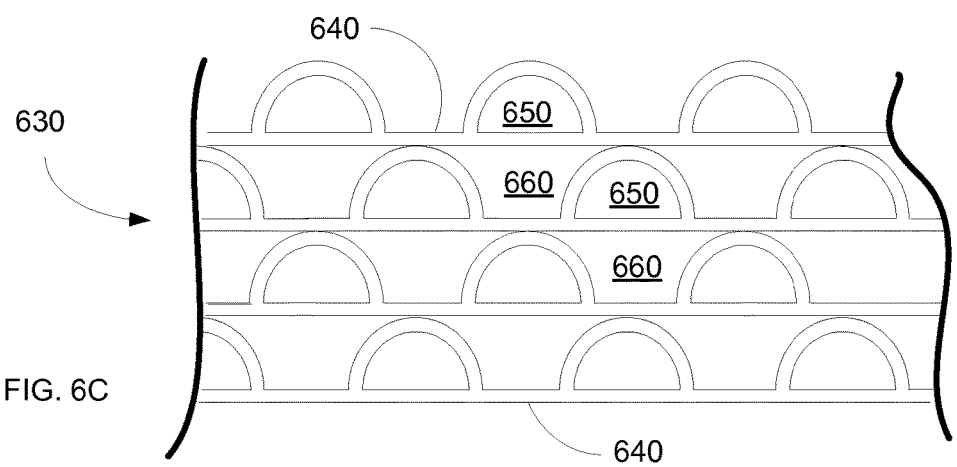

FIGS. 6A-C illustrate exemplary stacked structures, according to some embodiments. In some cases, a body may be fabricated from a plurality of tapes (e.g., textured tapes). Texture in the tapes may be used to create a desired texture (e.g., flow pattern) in a body comprising a plurality of tapes (or a rolled tape, a helical tape, and the like). FIG. 6A illustrates exemplary stack 600 comprising a plurality of textured tapes 610. In some cases, tapes 610 may be fired (e.g., before stacking). In some cases, tapes may be stacked, rolled, or otherwise assembled, then fired. In some embodiments, a toothed blade may include a triangular deformation zone near a root of a tooth (e.g., associated with the top of a wall of a channel, which may be configured to deform under pressure from a tape stacked on top.

FIG. 6B illustrates an exemplary stack of different tapes. Stack 620 includes a plurality of tapes. Tape 610 may comprise a first material. Tape 612 may comprise a second material, and in this example has a different channel structure than does tape 610. Tape 614 may comprise a third material (e.g., a porous material). Tape 616 may comprise a floor of a first material and channel walls of a second material. In some embodiments, a bonding material is disposed between tapes to facilitate bonding between the tapes. A bonding material may comprise a lower-viscosity formulation of a material from which the tapes are fabricated.

FIG. 6C illustrates an exemplary stack of tapes, according to some embodiments. Stack 630 includes a plurality of tapes 640. In some embodiments, tapes 640 are fabricated from a toothed blade such as blade 410 (FIG. 4). Some bodies include channels having different cross sectional shapes, such as a first shape 650 and a second shape 660. In some cases, a wall between adjacent channels is porous. In some cases, the floor between tapes is porous.

Figure 7:
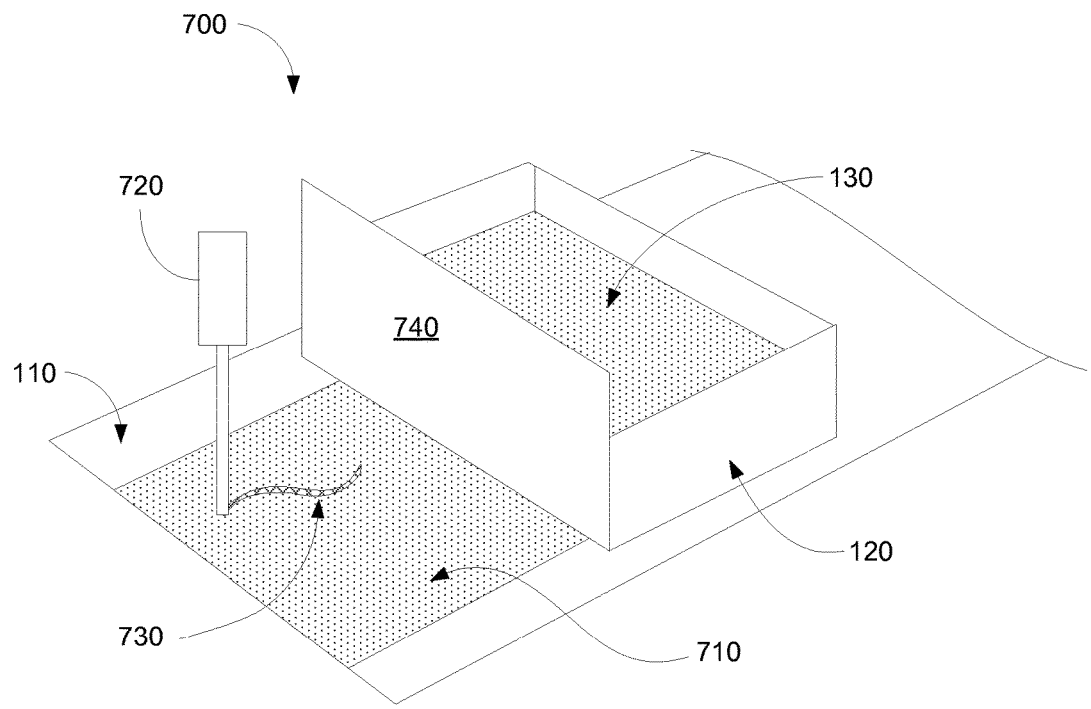
FIG. 7 illustrates an exemplary system for incorporating texture, according to some embodiments.

FIG. 7 illustrates an exemplary system for incorporating texture, according to some embodiments. System 700 includes a hopper 120 of material 130, and may be configured to cast material 130 onto carrier 110 to form a cast tape 710. Cast tape 710 may be a textured tape and/or a smooth tape. Injector 720 is configured to impart a texture to tape 710, forming a textured portion 730. Injector 720 may include a pressurized source of material and a nozzle to inject the material onto tape 710. Injector 720 may inject material 130 and/or a different material onto tape 710.

Notwithstanding its being termed an injector, injector 720 may include a probe, needle, knife edge, and/or other solid feature, whose contact with tape 710 may texture tape 710. In some embodiments, injector 720 includes an oscillating probe that touches tape 710. Injector 720 may be configured to touch tape 710 using a probe that locally (e.g., ultrasonically) generates a shear stress that is high enough to cause plastic deformation proximate to the probe. In some embodiments, injector 720 includes a robotic stage (e.g., to move injector 720 across tape 710). In some embodiments, injector 720 is controlled with an x,y,z stage and/or a multiaxis robotic arm. Injector 720 may be configured to interact with (e.g., stir) material in hopper 120. Injector 720 may be configured to interact with (e.g., vibrate) blade 740.

Figure 8:
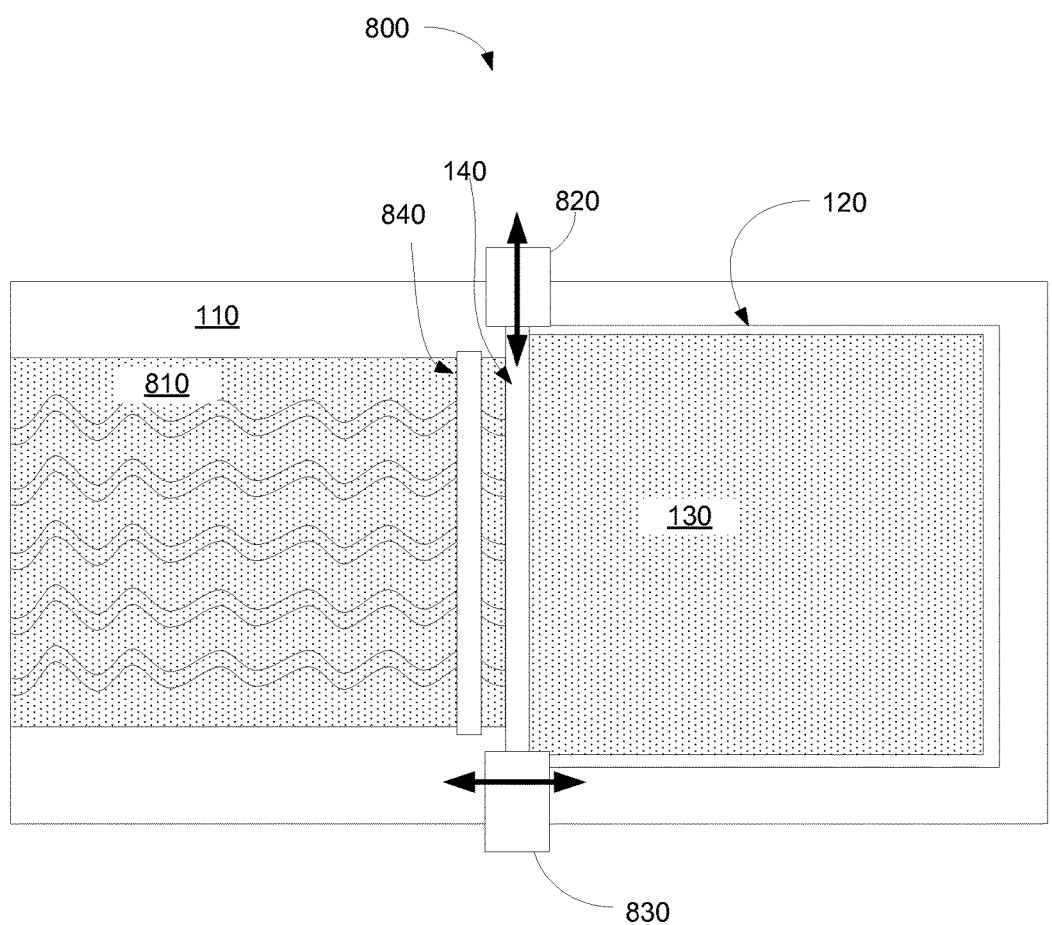
FIG. 8 illustrates an exemplary embodiment.

FIG. 8 illustrates an exemplary embodiment. System 800 includes a hopper 120 that holds material 130 for casting onto carrier 110 using blade 140, forming tape 810. Motion control apparatus 820 and 830 may be used to move blade 140, and are shown schematically by their effects on blade 140. Blade 140 may be moved in lateral direction 820 and/or longitudinal direction 830. In some embodiments, blade 140 is oscillated. Blade 140 may be moved in a manner that imparts a shear stress to the material 130 passing beneath blade 140. In some cases, an otherwise "stiff" material 130 is locally liquefied by blade 140, allowing for casting of tape 810. For some implementations (e.g., toothed blades 140), motion of blade 140 may be used to create curved and/or angled channel walls.

In some implementations, a blade may be oscillated at an amplitude larger than a width of the wall(s) that define channels. Plastic deformation at the wall/floor interface may provide for "shifting" the wall with respect to the floor under the shear stress induced by the blade. In some cases, a blade may be oscillated at an amplitude approximately equal to the width of the walls of the channels. For some applications, a blade may be oscillated at an amplitude less than, less than 50% of, less than 10% of, less than 5% of, or even less than 1% of the width of the channels and/or walls. In select implementations, walls may be between 200 microns and 2 mm thick, including between 300 microns and 800 microns thick. A blade may be oscillated at an amplitude of 1 micron to 1 mm, including between 10 microns and 100 microns. In some cases, a wall may be between 1-100 cm thick, including between 5 and 40 cm thick, and a blade may be oscillated several mm. A blade may be moved horizontally (e.g., laterally) and vertically during casting (e.g., during longitudinal motion). In some embodiments, a blade casts in a longitudinal direction, oscillates in a lateral direction, and moves in a vertical direction. In some cases, a blade casts in a longitudinal direction and oscillates in a longitudinal direction. In some cases a blade oscillates in multiple directions (e.g., a bottom edge of the blade circumscribes an ellipse, circle, and or other two dimensional pattern). Some blades may be actuated to resonate during casting.

Exemplary system 800 also includes an apparatus 840 to induce stiffening and/or hardening of tape 810 after texturing. Apparatus 840 may include a heater, an air jet, a light source, an LED, a laser, and the like. Apparatus 840 may deposit a powder or spray a liquid onto tape 810. In some embodiments, apparatus 840 deposits a layer of fly ash (e.g., having D90 less than 70 microns) on tape 810. In some cases, a deposited fly ash includes a class C fly ash. In some embodiments, material 130 includes a UV curable paste, and apparatus 840 includes an array of UV LEDs.

Figure 9:
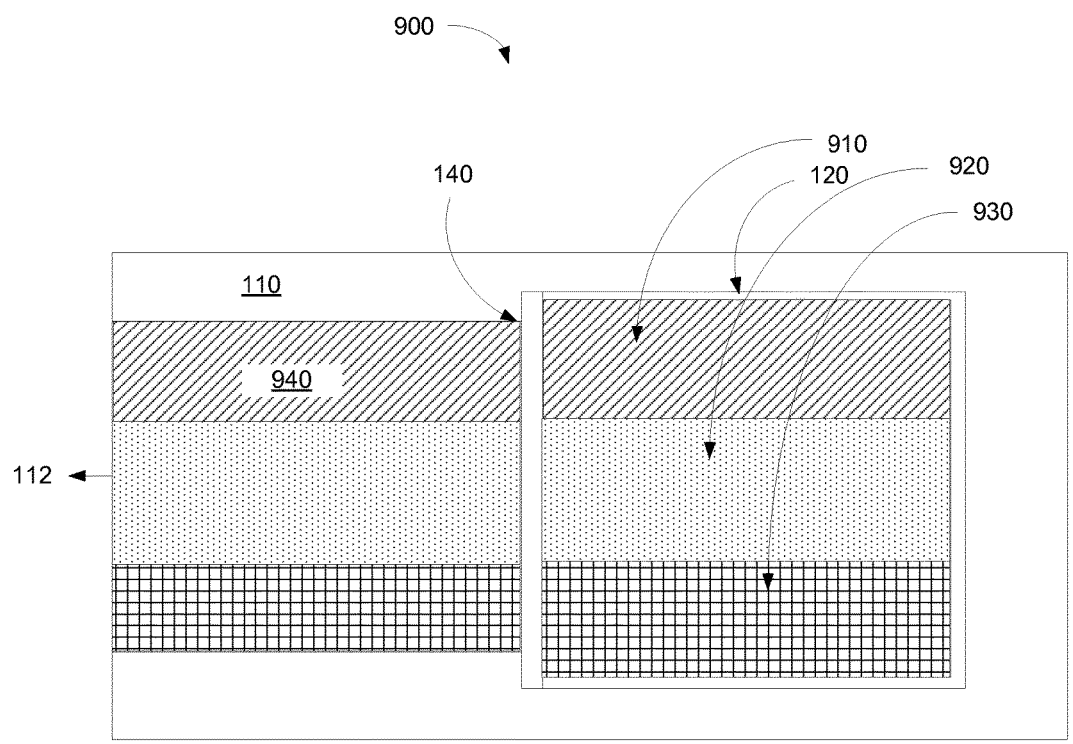
FIG. 9 illustrates an exemplary embodiment.

FIG. 9 illustrates an exemplary embodiment. Apparatus 900 includes a hopper 120 configured to hold materials 910, 920, and 930 for casting onto carrier 110, to form a composite tape 940. In some embodiments, shear-thinning materials 910, 920, and 930 may be of sufficiently high viscosity within hopper 120 that they do not substantially mix. Apparatus 900 may locally create sufficient shear forces (e.g., near blade 140) that composite tape 940 comprising materials 910, 920, and 930 is formed. In some cases, materials (e.g., 910, 920, 930) are arranged with their interfaces oriented parallel to a tape direction (as shown in FIG. 9). In some cases, materials are arranged with their interface(s) oriented at an angle (or even orthogonal to) the tape direction.

Figure 10:
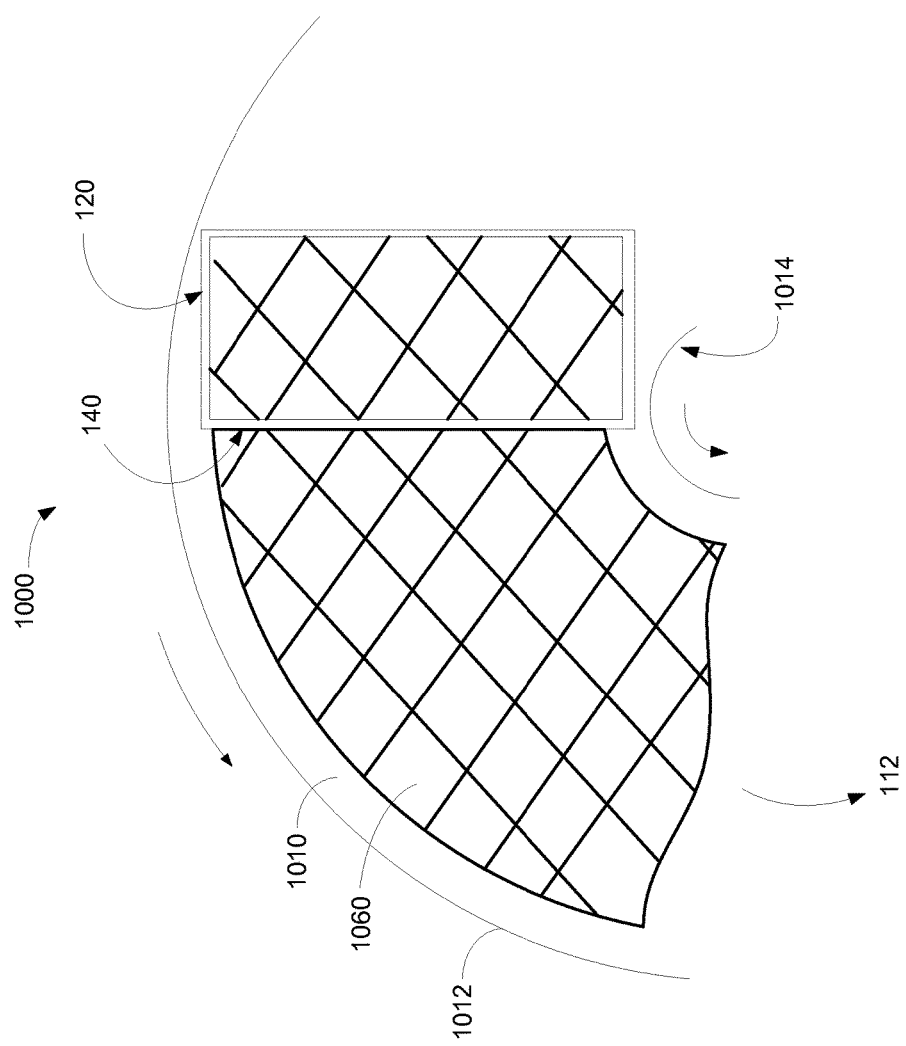
FIG. 10 illustrates an exemplary embodiment.

FIG. 10 illustrates an exemplary embodiment. Hopper 120 may contain a material to be cast onto carrier 1010 via blade 140 to form tape 1060. Carrier 1010 may be configured to pass beneath blade 140 at a velocity that is different at different portions of blade 140. In some cases, carrier 1010 may include a turntable rotating at an angular velocity. The linear velocity of carrier 1010 may vary radially, with the outer circumference 1012 moving at a faster linear velocity than the inner circumference 1014. In some cases, carrier 1010 may include a top sheet (e.g., a polymer film), which may be helical. Tape 1060 may be annular (e.g., a single layer). Tape 1060 may be helical. In some cases, a first layer of tape 1060 is cast onto carrier 1010, rotates around to pass beneath blade 140, and a second layer is cast upon the first layer, forming a helical tape.

Figure 11A:
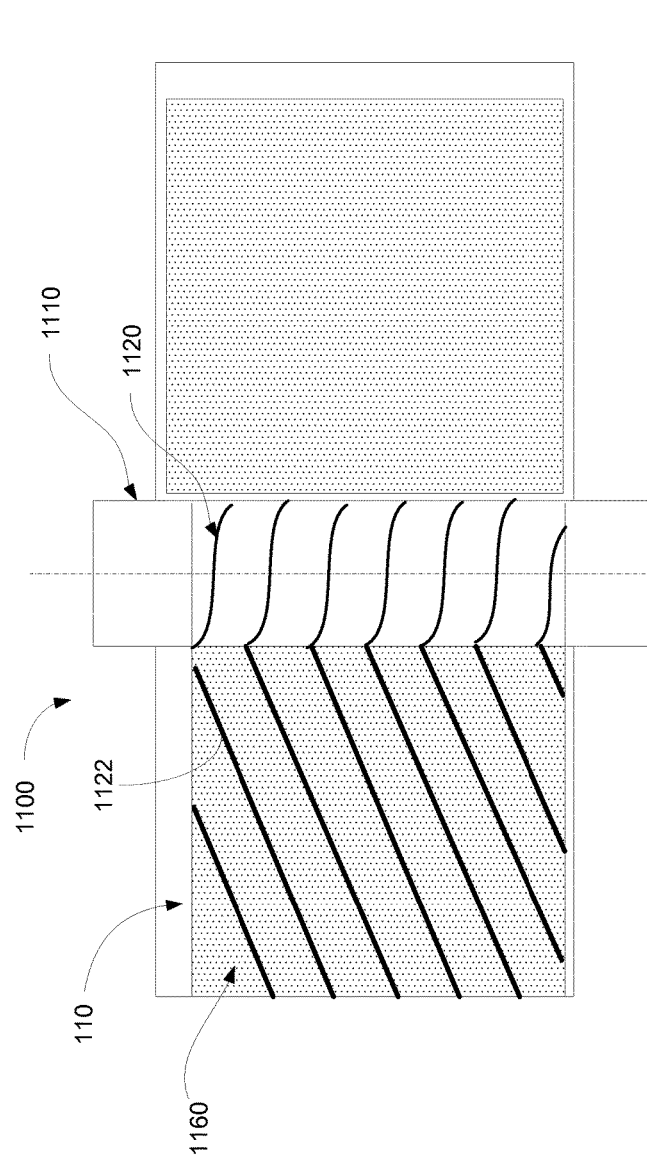
FIG. 11A_B illustrates an embossing apparatus, according to some embodiments.
Figure 11B:
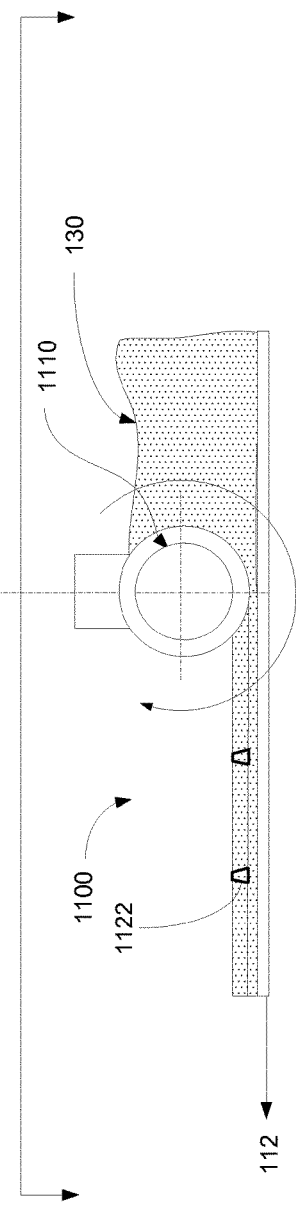

FIG. 11A_B illustrates an embossing apparatus, according to some embodiments. Apparatus 1100 includes a carrier 110 onto which a tape may be cast. A roller 1110 comprises a pattern 1120 configured to emboss a corresponding texture 1122 into tape 1160. Embossing may provide for a combination of shear and normal forces (imparted onto a cast material) adapted to forming texture in some materials.

Apparatus 1100 stores material 130 "upstream" of roller 1110, which may roll, compact, and otherwise form tape 1160, in addition to embossing tape 1160. Roller 1110 may be adjusted vertically to control tape thickness. In some cases, roller 1110 may be translated laterally with respect to a tape direction 112. Roller 1110 may be oscillated and/or otherwise actuated to impart an oscillatory force to material 130 being cast. Roller 1110 may include a pattern 1120 configured to generate channels in texture 1122 that traverse tape 1160 at an angle. In some implementations (not shown), roller 1110 may create channels oriented in tape direction 112. In some cases (not shown), roller 1110 may create channels oriented orthogonally to tape direction 112. Channels and walls may be curved. A method may comprise forming one or more tapes having one or more fugitive phases, arranging the tapes to create a layered structure, removing the fugitive phase, and bonding the tapes together. In some cases, a structure has a first porosity, and the structure is exposed to a fluid (e.g., a gas or liquid) carrying particles. Particles are deposited on (e.g., filtered by) the body, yielding a modified body having a second porosity different than the first porosity. In some cases, a first portion of a body has a first porosity and a second portion has a second porosity.

In some embodiments, a roller may modify a texture by inducing deformation in the texture. In an exemplary embodiment, a textured tape comprises walls having deformation zones. The tape passes below a roller or low angled "spatula" that applies sufficient pressure to the walls to induce deformation in the deformation zone. In some cases, a roller may seal channels formed in a taped substrate (e.g., by folding over walls).

FIGS. 12A-B illustrate an embossing apparatus, according to some embodiments. Apparatus 1200 includes a carrier 110 onto which a tape may be cast. A mold 1210 comprises pattern 1220 configured to emboss a corresponding texture 1222 onto tape 1260. Mold 1210 may be controlled to provide for vertical displacement with respect to and/or applied pressure against tape 1260. Mold 1210 may be vibrated and/or oscillated.

In some implementations, a tape may be cast in a first step (e.g., using a blade) and textured in a second step. In apparatus 1200, a hopper 120 contains a material to be tape cast using blade 140. The cast tape is then embossed by mold 1210. In select embodiments, a tape is fabricated from a shear thinning material, and both blade 140 and mold 1210 are configured to impart (e.g., via oscillation) a localized shear stress sufficient to locally deform the tape. In such cases, a relatively stiff paste may be cast into a thin tape using blade 140 by inducing viscosity-lowering shear stress, a texture 1222 may be created using viscosity-lowering shear, and texture 1222 is maintained after its formation by the subsequent high viscosity of the unsheared material.

Figure 13:
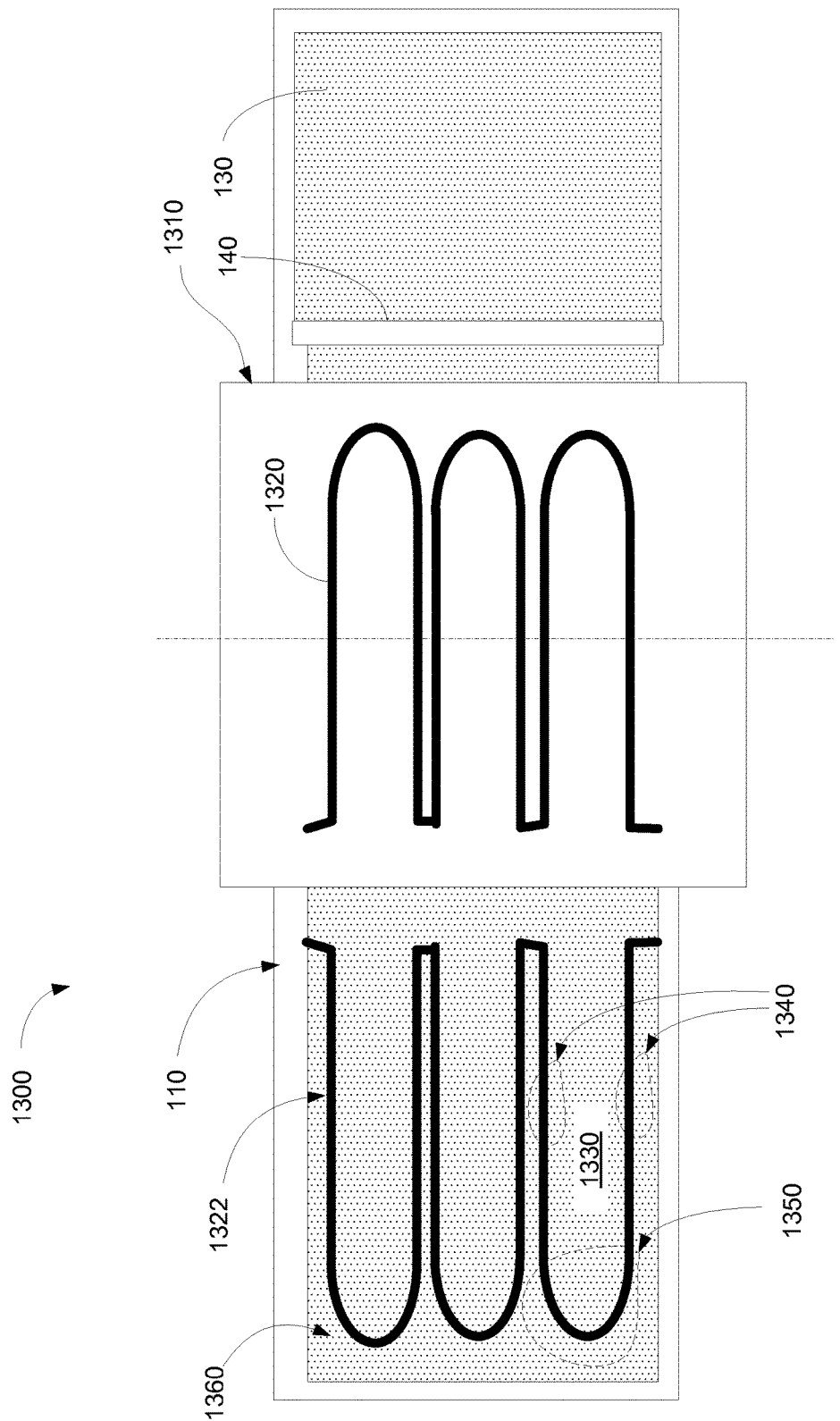
FIG. 13 illustrates an embossing apparatus, according to some embodiments.

FIG. 13 illustrates an embossing apparatus, according to some embodiments. Apparatus 1300 includes a carrier 110 onto which a tape may be cast. A mold 1310 comprises pattern 1320 configured to emboss a corresponding texture 1322 onto tape 1360. Mold 1310 may be controlled to provide for vertical displacement with respect to and/or applied pressure against tape 1360. Mold 1310 may be vibrated and/or oscillated.

In some cases, pattern 1320 may create a texture 1322 comprising a channel. In tape 1360, a channel 1330 may be bounded by walls 1340 and a back 1350, which may create a "closed end" channel with addition of a roof or ceiling (e.g., a stacked layer on top of tape 1360. In some cases, a closed end channel may be created with an injector (e.g., by injecting a material into an end of a channel). A closed end channel may be used as a filter (e.g., when fabricated from a porous material and/or a material that may be processed to become a porous material).

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. An apparatus for casting a textured tape, the apparatus comprising:
   a hopper configured to contain a material to be formed into the textured tape as the material exits the hopper;
   a carrier configured to carry a tape of the material as it exits the hopper;
   a toothed blade defining a gap through which the material exits the hopper onto the carrier, the gap defined at least in part by:
      a vertical distance from the carrier to a bottom edge of the toothed blade, the vertical distance defining a floor thickness of the cast tape; and
      a gap width that defines a tape width of the cast tape;
   the toothed blade having:
      a plurality of teeth, each tooth having a tooth shape that at least partially defines a channel shape in the cast tape, and a space between adjacent teeth that at least partially defines a wall shape of a wall in the cast tape; and a motion control apparatus configured to move at least one of the toothed blade and carrier in a longitudinal direction, wherein the motion control apparatus is further configured to oscillate at least one of the toothed blade and the carrier at an amplitude.

2. An apparatus for casting a textured tape, the apparatus comprising:

a hopper configured to contain a material to be formed into the textured tape as the material exits the hopper;

a carrier configured to carry a tape of the material as it exits the hopper;

a toothed blade defining a gap through which the material exits the hopper onto the carrier, the gap defined at least in part by:

a vertical distance from the carrier to a bottom edge of the toothed blade, the vertical distance defining a floor thickness of the cast tape; and a gap width that defines a tape width of the cast tape; the toothed blade having:

a plurality of teeth, each tooth having a tooth shape that at least partially defines a channel shape in the cast tape, and a space between adjacent teeth that at least partially defines a wall shape of a wall in the cast tape; and a motion control apparatus configured to move at least one of the toothed blade and carrier in a longitudinal direction, wherein the gap width is greater than ten times a height of the space between at least two adjacent teeth.

3. An apparatus for casting a textured tape, the apparatus comprising:

a hopper configured to contain a material to be formed into the textured tape as the material exits the hopper;

a carrier configured to carry a tape of the material as it exits the hopper;

a toothed blade defining a gap through which the material exits the hopper onto the carrier, the gap defined at least in part by:

a vertical distance from the carrier to a bottom edge of the toothed blade, the vertical distance defining a floor thickness of the cast tape; and a gap width that defines a tape width of the cast tape; the toothed blade having:

a plurality of teeth, each tooth having a tooth shape that at least partially defines a channel shape in the cast tape, and a space between adjacent teeth that at least partially defines a wall shape of a wall in the cast tape; and a motion control apparatus configured to move at least one of the toothed blade and carrier in a longitudinal direction, further comprising an apparatus disposed above the carrier and downstream of the gap, the apparatus configured to induce hardening of the material in the cast tape via at least one of:

exposing the tape to light;
depositing a powder on the tape; and
spraying a liquid onto the tape.

4. The apparatus of claim 1, wherein the amplitude is less than at least one of:

a width of a channel defined by at least one tooth shape; and a width of a wall defined by at least one space between adjacent teeth.

5. The apparatus of claim 4, wherein the amplitude is less than 10% of the width of the wall.

6. The apparatus of claim 1, wherein the amplitude is less than 2mm.

7. The apparatus of claim 1, wherein the gap width is greater than ten times a height of the space between at least two adjacent teeth.

8. The apparatus of claim 7, wherein:

at least one space between adjacent teeth includes a space height that is greater than the space width; and the amplitude is less than at least one of:

a width of a channel defined by at least one tooth shape; and a width of a wall defined by at least one space between adjacent teeth.

9. The apparatus of claim 1, wherein at least one space between adjacent teeth includes a space height that is greater than the space width.

10. The apparatus of claim 1, wherein the space between at least two adjacent teeth has a height that is greater than the vertical distance.

11. The apparatus of claim 1, wherein at least a portion of the carrier includes a top surface that is textured.

12. The apparatus of claim 2, wherein the space between at least two adjacent teeth has a height that is greater than the vertical distance.

13. The apparatus of claim 2, wherein at least a portion of the carrier includes a top surface that is textured.

14. The apparatus of claim 2, wherein the motion control apparatus is further configured to move the at least one of the toothed blade and carrier at a velocity in the longitudinal direction that varies across the gap width.

15. The apparatus of claim 2, wherein at least one tooth includes an edge that is off-vertical with respect to the bottom edge of the tooth.

16. The apparatus of claim 3, wherein the space between at least two adjacent teeth has a height that is greater than the vertical distance.

17. The apparatus of claim 3, wherein at least one space between adjacent teeth includes a space height that is greater than the space width.

18. The apparatus of claim 3, wherein the gap width is greater than ten times a height of the space between at least two adjacent teeth.

19. The apparatus of claim 3, wherein the motion control apparatus is further configured to oscillate at least one of the toothed blade and the carrier at an amplitude.

20. The apparatus of claim 3, wherein at least a portion of the carrier includes a top surface that is textured.

* * * * *